US008902866B2

(12) United States Patent
Laroia et al.

(10) Patent No.: US 8,902,866 B2
(45) Date of Patent: Dec. 2, 2014

(54) COMMUNICATION METHODS AND APPARATUS WHICH MAY BE USED IN THE ABSENCE OR PRESENCE OF BEACON SIGNALS

(75) Inventors: Rajiv Laroia, Far Hills, NJ (US); Frank A. Lane, Asbury, NJ (US); Junyi Li, Bedminster, NJ (US); Tom Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1363 days.

(21) Appl. No.: 11/621,985

(22) Filed: Jan. 10, 2007

(65) Prior Publication Data

US 2007/0206554 A1 Sep. 6, 2007

Related U.S. Application Data

(60) Provisional application No. 60/758,011, filed on Jan. 11, 2006, provisional application No. 60/758,010, (Continued)

(51) Int. Cl.
*H04W 4/00* (2009.01)
*H04W 36/16* (2009.01)

(Continued)

(52) U.S. Cl.
CPC .............. *H04W 72/02* (2013.01); *H04W 28/18* (2013.01); *H04L 5/0048* (2013.01);

(Continued)

(58) Field of Classification Search
USPC .......... 370/338, 444, 455, 395.42; 455/435.3, 455/512, 527, 166.2
See application file for complete search history.

(56) References Cited

U.S. PATENT DOCUMENTS 2,972,743 A 2/1961 Svensson et al.
5,216,693 A 6/1993 Nakamura
(Continued)

FOREIGN PATENT DOCUMENTS

CN 1310927 A 8/2001
CN 1327354 A 12/2001
(Continued)

OTHER PUBLICATIONS

International Search Report—PCT/US2007/060351, International Search Authority—European Patent Office—May 25, 2007.

(Continued)

*Primary Examiner* — Gerald Johnson
(74) *Attorney, Agent, or Firm* — James K. O'Hare

(57) ABSTRACT

Wireless devices, e.g., in a cognitive radio network, discover and use locally available usable spectrum for communication. Beacon signaling facilitates available spectrum discovery, spectrum usage coordination, and device identification. A wireless terminal, which may have entered a new area and powered up, monitors to detect for the presence of beacon signals in a communications band. When the wireless terminal fails to detect a beacon, the wireless terminal assumes that the spectrum is available and transmits its user beacon signal thereby providing notification of its presence in the area to other wireless terminals. The wireless terminal maintains a coordinated timing relationship between its beacon transmit interval and beacon detect interval, which are performed on an ongoing basis. The combination of beacon TX interval and beacon monitoring interval represents a small fraction of total time, allowing for power conservation. The coordinated timing relationship, known to peers, facilitates efficient peer-peer communications session establishment.

43 Claims, 14 Drawing Sheets

Related U.S. Application Data filed on Jan. 11, 2006, provisional application No. 60/758,012, filed on Jan. 11, 2006, provisional application No. 60/863,304, filed on Oct. 27, 2006, provisional application No. 60/845,052, filed on Sep. 15, 2006, provisional application No. 60/845,051, filed on Sep. 15, 2006.

(51) Int. Cl.
| | |
|---|---|
| *H04W 16/14* | (2009.01) |
| *H04W 72/02* | (2009.01) |
| *H04W 88/10* | (2009.01) |
| *H04W 8/00* | (2009.01) |
| *H04W 48/20* | (2009.01) |
| *H04W 52/02* | (2009.01) |
| *H04W 28/18* | (2009.01) |
| *H04L 5/00* | (2006.01) |
| *H04W 88/06* | (2009.01) |
| *H04W 28/04* | (2009.01) |
| *H04L 27/26* | (2006.01) |
| *H04W 84/18* | (2009.01) |
| *H04W 48/16* | (2009.01) |
| *H04W 52/04* | (2009.01) |
| *H04J 3/06* | (2006.01) |
| *H04W 40/24* | (2009.01) |
| *H04W 84/04* | (2009.01) |
| *H04W 88/04* | (2009.01) |
| *H04W 48/08* | (2009.01) |
| *H04W 36/24* | (2009.01) |
| *H04W 88/02* | (2009.01) |

(52) U.S. Cl.
CPC ............. *H04L 5/0035* (2013.01); *H04W 88/06* (2013.01); *H04W 28/048* (2013.01); *Y02B 60/50* (2013.01); *H04W 36/16* (2013.01); *H04L 5/0016* (2013.01); *H04L 27/2601* (2013.01); *H04W 84/18* (2013.01); *H04W 48/16* (2013.01); *H04W 52/04* (2013.01); *H04W 16/14* (2013.01); *H04J 3/0602* (2013.01); *H04W 40/24* (2013.01); *H04W 88/10* (2013.01); *H04W 84/042* (2013.01); *H04W 88/04* (2013.01); *H04L 27/261* (2013.01); *H04W 8/005* (2013.01); *H04W 48/20* (2013.01); *H04W 48/08* (2013.01); *H04W 36/24* (2013.01); *H04W 52/0229* (2013.01); *H04W 88/02* (2013.01)
USPC ........... 370/338; 370/208; 455/434; 455/514; 455/452.2; 455/454; 455/41.2

(56) References Cited

U.S. PATENT DOCUMENTS

| | | | |
|---|---|---|---|
| 5,233,627 A | 8/1993 | Kozima et al. |
| 5,535,425 A | 7/1996 | Watanabe |
| 5,583,870 A | 12/1996 | Delprat et al. |
| 5,701,589 A | 12/1997 | Lee et al. |
| 5,726,893 A | 3/1998 | Schuchman et al. |
| 5,754,542 A | 5/1998 | Ault et al. |
| 5,805,575 A | 9/1998 | Kamin, Jr. |
| 5,818,871 A | 10/1998 | Blakeney, II et al. |
| 5,839,074 A | 11/1998 | Plehn |
| 5,844,900 A * | 12/1998 | Hong et al. .................. 370/342 |
| 5,852,780 A | 12/1998 | Wang et al. |
| 5,903,618 A | 5/1999 | Miyake et al. |
| 5,940,765 A | 8/1999 | Haartsen |
| 5,953,323 A | 9/1999 | Haartsen |
| 5,991,639 A | 11/1999 | Rautiola et al. |
| 5,995,500 A | 11/1999 | Ma et al. |
| 5,995,844 A | 11/1999 | Fukuda |
| 6,011,515 A | 1/2000 | Radcliffe et al. |
| 6,011,978 A | 1/2000 | Ault et al. |
| 6,047,178 A | 4/2000 | Frlan |
| 6,175,747 B1 | 1/2001 | Tanishima et al. |
| 6,230,012 B1 | 5/2001 | Willkie et al. |
| 6,377,608 B1 | 4/2002 | Zyren |
| 6,389,062 B1 | 5/2002 | Wu |
| 6,473,418 B1 | 10/2002 | Laroia et al. |
| 6,545,997 B1 | 4/2003 | Bohnke et al. |
| 6,574,266 B1 | 6/2003 | Haartsen |
| 6,580,981 B1 | 6/2003 | Masood et al. |
| 6,609,010 B1 | 8/2003 | Dolle et al. |
| 6,611,507 B1 | 8/2003 | Hottinen et al. |
| 6,614,769 B1 | 9/2003 | Erlick et al. |
| 6,650,629 B1 | 11/2003 | Takahashi et al. |
| 6,671,525 B2 | 12/2003 | Allen et al. |
| 6,725,058 B2 | 4/2004 | Rinne et al. |
| 6,728,232 B2 | 4/2004 | Hasty, Jr. et al. |
| 6,735,448 B1 | 5/2004 | Krishnamurthy et al. |
| 6,741,836 B2 | 5/2004 | Lee et al. |
| 6,744,743 B2 | 6/2004 | Walton et al. |
| 6,760,599 B1 | 7/2004 | Uhlik |
| 6,763,013 B2 | 7/2004 | Kennedy |
| 6,771,706 B2 | 8/2004 | Ling et al. |
| 6,771,963 B1 | 8/2004 | Cheng et al. |
| 6,859,463 B1 | 2/2005 | Mayor et al. |
| 6,882,632 B1 | 4/2005 | Koo et al. |
| 6,882,851 B2 | 4/2005 | Sugar et al. |
| 6,920,171 B2 | 7/2005 | Souissi et al. |
| 6,922,388 B1 | 7/2005 | Laroia et al. |
| 6,934,299 B2 | 8/2005 | Kaatz |
| 6,940,827 B2 | 9/2005 | Li et al. |
| 6,940,843 B2 | 9/2005 | Goodall et al. |
| 6,975,600 B1 | 12/2005 | Vaughan et al. |
| 6,975,855 B1 | 12/2005 | Wallenius |
| 6,982,987 B2 | 1/2006 | Cain |
| 6,990,087 B2 | 1/2006 | Rao et al. |
| 7,006,451 B2 | 2/2006 | Kuwahara |
| 7,013,145 B1 | 3/2006 | Centore, III |
| 7,016,649 B1 | 3/2006 | Narasimhan et al. |
| 7,027,409 B2 | 4/2006 | Cain |
| 7,035,221 B2 | 4/2006 | Furukawa et al. |
| 7,039,372 B2 | 5/2006 | Sorrells et al. |
| 7,072,650 B2 | 7/2006 | Stanforth |
| 7,092,353 B2 | 8/2006 | Laroia et al. |
| 7,092,391 B2 | 8/2006 | Umeda |
| 7,130,368 B1 | 10/2006 | Aweya et al. |
| 7,133,697 B2 | 11/2006 | Judd et al. |
| 7,136,655 B2 | 11/2006 | Skafidas et al. |
| 7,146,130 B2 | 12/2006 | Hsu et al. |
| 7,149,201 B2 | 12/2006 | Hunzinger |
| 7,164,885 B2 | 1/2007 | Jonsson et al. |
| 7,167,463 B2 | 1/2007 | Alapuranen |
| 7,174,187 B1 | 2/2007 | Ngan |
| 7,180,884 B2 | 2/2007 | Elliott et al. |
| 7,194,263 B2 | 3/2007 | Bahl et al. |
| 7,218,689 B2 | 5/2007 | Gupta |
| 7,224,954 B2 | 5/2007 | Okajima et al. |
| 7,228,138 B2 | 6/2007 | Hansson et al. |
| 7,233,602 B2 | 6/2007 | Chen et al. |
| 7,246,235 B2 | 7/2007 | Ellison et al. |
| 7,248,570 B2 | 7/2007 | Bahl et al. |
| 7,260,399 B1 | 8/2007 | Oh et al. |
| 7,269,169 B1 | 9/2007 | Venkataraman et al. |
| 7,280,467 B2 | 10/2007 | Smee et al. |
| 7,280,810 B2 | 10/2007 | Feher |
| 7,313,628 B2 | 12/2007 | Chaskar et al. |
| 7,333,829 B2 | 2/2008 | Malone et al. |
| 7,336,626 B1 | 2/2008 | Barratt et al. |
| 7,336,927 B2 | 2/2008 | Diaz Cervera et al. |
| 7,339,883 B2 | 3/2008 | Santhoff et al. |
| 7,342,834 B2 | 3/2008 | Ishibashi |
| 7,342,896 B2 | 3/2008 | Ayyagari |
| 7,342,900 B2 | 3/2008 | Xiong et al. |
| 7,352,733 B2 | 4/2008 | Green |
| 7,366,200 B2 | 4/2008 | Laroia et al. |
| 7,386,306 B2 | 6/2008 | Laroia et al. |
| 7,388,857 B2 | 6/2008 | Sharma |

(56) References Cited

U.S. PATENT DOCUMENTS

| | | | |
|---|---|---|---|
| 7,401,224 B2 | 7/2008 | Gantman et al. | |
| 7,426,396 B2 | 9/2008 | Iwasaki et al. | |
| 7,440,754 B2 | 10/2008 | Bahl et al. | |
| 7,457,646 B2 | 11/2008 | Mahany et al. | |
| 7,477,897 B2 | 1/2009 | Bye | |
| 7,489,651 B2 | 2/2009 | Sugaya et al. | |
| 7,493,149 B1 | 2/2009 | Doyle et al. | |
| 7,499,418 B2 | 3/2009 | Oprescu-Surcobe et al. | |
| 7,502,341 B2 | 3/2009 | Matoba et al. | |
| 7,512,096 B2 | 3/2009 | Kuzminskiy et al. | |
| 7,545,771 B2 * | 6/2009 | Wentink et al. | 370/329 |
| 7,548,758 B2 | 6/2009 | Periyalwar et al. | |
| 7,570,627 B2 | 8/2009 | Welborn et al. | |
| 7,570,969 B2 | 8/2009 | Hwang et al. | |
| 7,586,881 B2 | 9/2009 | Hansen et al. | |
| 7,590,183 B2 | 9/2009 | Yonge, III et al. | |
| 7,613,426 B2 | 11/2009 | Kuehnel et al. | |
| 7,626,975 B2 | 12/2009 | Colban et al. | |
| 7,653,011 B2 | 1/2010 | Rahman et al. | |
| 7,657,276 B2 * | 2/2010 | Sakoda | 455/522 |
| 7,660,595 B2 | 2/2010 | Ramaswamy et al. | |
| 7,664,055 B2 | 2/2010 | Nelson | |
| 7,720,029 B2 | 5/2010 | Orava et al. | |
| 7,720,172 B2 | 5/2010 | Nakagawa et al. | |
| 7,724,713 B2 | 5/2010 | Del Prado Pavon et al. | |
| 7,729,240 B1 | 6/2010 | Crane et al. | |
| 7,756,521 B2 | 7/2010 | Gerlach et al. | |
| 7,925,010 B2 | 4/2011 | Sannino et al. | |
| 8,068,841 B2 | 11/2011 | Laroia et al. | |
| 8,284,752 B2 | 10/2012 | Ketchum et al. | |
| 8,498,237 B2 | 7/2013 | Corson et al. | |
| 8,504,099 B2 | 8/2013 | Corson et al. | |
| 2001/0055980 A1 | 12/2001 | Sato | |
| 2002/0105970 A1 | 8/2002 | Shvodian | |
| 2002/0128049 A1 | 9/2002 | Davis | |
| 2002/0131121 A1 | 9/2002 | Jeganathan et al. | |
| 2002/0131386 A1 | 9/2002 | Gwon | |
| 2002/0193945 A1 | 12/2002 | Tan et al. | |
| 2002/0196771 A1 | 12/2002 | Vij et al. | |
| 2002/0196844 A1 | 12/2002 | Rafie et al. | |
| 2003/0002482 A1 | 1/2003 | Kubler et al. | |
| 2003/0007473 A1 | 1/2003 | Strong et al. | |
| 2003/0012188 A1 | 1/2003 | Zelig et al. | |
| 2003/0054818 A1 | 3/2003 | Bahl et al. | |
| 2003/0063655 A1 | 4/2003 | Young | |
| 2003/0069035 A1 | 4/2003 | Shurvinton | |
| 2003/0078031 A1 | 4/2003 | Masuda | |
| 2003/0078037 A1 | 4/2003 | Auckland et al. | |
| 2003/0108016 A1 | 6/2003 | Bonta | |
| 2003/0128659 A1 | 7/2003 | Hirsch et al. | |
| 2003/0142631 A1 | 7/2003 | Silvester | |
| 2003/0145064 A1 | 7/2003 | Hsu et al. | |
| 2003/0169697 A1 | 9/2003 | Suzuki et al. | |
| 2003/0174067 A1 | 9/2003 | Soliman | |
| 2003/0181213 A1 * | 9/2003 | Sugar et al. | 455/454 |
| 2003/0217266 A1 | 11/2003 | Epp et al. | |
| 2004/0005904 A1 * | 1/2004 | Wolf et al. | 455/519 |
| 2004/0008661 A1 | 1/2004 | Myles et al. | |
| 2004/0009781 A1 | 1/2004 | Andrews et al. | |
| 2004/0028003 A1 | 2/2004 | Diener et al. | |
| 2004/0032536 A1 | 2/2004 | Islam et al. | |
| 2004/0047324 A1 | 3/2004 | Diener | |
| 2004/0057400 A1 | 3/2004 | Walsh et al. | |
| 2004/0063458 A1 | 4/2004 | Hori et al. | |
| 2004/0064568 A1 | 4/2004 | Arora et al. | |
| 2004/0067773 A1 | 4/2004 | Rachabathuni et al. | |
| 2004/0072558 A1 | 4/2004 | Van Bosch | |
| 2004/0077346 A1 | 4/2004 | Krenik et al. | |
| 2004/0077366 A1 * | 4/2004 | Panasik et al. | 455/514 |
| 2004/0081117 A1 | 4/2004 | Malek et al. | |
| 2004/0082326 A1 | 4/2004 | Shaw et al. | |
| 2004/0082356 A1 | 4/2004 | Walton et al. | |
| 2004/0090924 A1 | 5/2004 | Giaimo et al. | |
| 2004/0095880 A1 * | 5/2004 | Laroia et al. | 370/208 |
| 2004/0095902 A1 | 5/2004 | Laroia et al. | |
| 2004/0095904 A1 | 5/2004 | Laroia et al. | |
| 2004/0106401 A1 | 6/2004 | Ormson | |
| 2004/0114521 A1 | 6/2004 | Sugaya | |
| 2004/0125776 A1 | 7/2004 | Haugli et al. | |
| 2004/0125778 A1 | 7/2004 | Lin et al. | |
| 2004/0127204 A1 | 7/2004 | Belmont | |
| 2004/0127214 A1 | 7/2004 | Reddy et al. | |
| 2004/0127240 A1 | 7/2004 | Li | |
| 2004/0133689 A1 | 7/2004 | Vasisht | |
| 2004/0145604 A1 | 7/2004 | Min | |
| 2004/0147223 A1 | 7/2004 | Cho | |
| 2004/0152464 A1 | 8/2004 | Sugaya | |
| 2004/0162871 A1 | 8/2004 | Pabla et al. | |
| 2004/0165563 A1 | 8/2004 | Hsu et al. | |
| 2004/0176059 A1 | 9/2004 | Hayem et al. | |
| 2004/0190483 A1 | 9/2004 | Shahaf et al. | |
| 2004/0203762 A1 | 10/2004 | Liu et al. | |
| 2004/0204850 A1 | 10/2004 | MacNeille et al. | |
| 2004/0240401 A1 | 12/2004 | Willenegger et al. | |
| 2004/0240405 A1 | 12/2004 | Okazaki | |
| 2004/0240476 A1 | 12/2004 | Joshi | |
| 2004/0249448 A1 | 12/2004 | Gault | |
| 2004/0258006 A1 | 12/2004 | An | |
| 2004/0259529 A1 | 12/2004 | Suzuki | |
| 2005/0009578 A1 | 1/2005 | Liu | |
| 2005/0017843 A1 * | 1/2005 | Fernandez | 340/7.3 |
| 2005/0025092 A1 | 2/2005 | Morioka et al. | |
| 2005/0037754 A1 | 2/2005 | Liu et al. | |
| 2005/0058102 A1 | 3/2005 | Santhoff et al. | |
| 2005/0058117 A1 | 3/2005 | Morioka et al. | |
| 2005/0058229 A1 | 3/2005 | Alagha | |
| 2005/0060535 A1 | 3/2005 | Bartas | |
| 2005/0063344 A1 | 3/2005 | Winzell | |
| 2005/0063416 A1 | 3/2005 | Shin et al. | |
| 2005/0068934 A1 | 3/2005 | Sakoda | |
| 2005/0075118 A1 | 4/2005 | Lewis et al. | |
| 2005/0085190 A1 | 4/2005 | Nishikawa | |
| 2005/0085214 A1 | 4/2005 | Laroia et al. | |
| 2005/0088980 A1 | 4/2005 | Olkkonen et al. | |
| 2005/0090266 A1 | 4/2005 | Sheynblat | |
| 2005/0105491 A1 | 5/2005 | Chaskar et al. | |
| 2005/0111397 A1 | 5/2005 | Attar et al. | |
| 2005/0117525 A1 | 6/2005 | Poustchi et al. | |
| 2005/0117530 A1 | 6/2005 | Abraham et al. | |
| 2005/0120097 A1 | 6/2005 | Walton et al. | |
| 2005/0128991 A1 | 6/2005 | Dayanandan et al. | |
| 2005/0129221 A1 | 6/2005 | Dickens et al. | |
| 2005/0135295 A1 | 6/2005 | Walton et al. | |
| 2005/0143119 A1 | 6/2005 | Chandra et al. | |
| 2005/0152280 A1 | 7/2005 | Pollin et al. | |
| 2005/0153736 A1 | 7/2005 | Ganton | |
| 2005/0157660 A1 | 7/2005 | Mandato et al. | |
| 2005/0176371 A1 | 8/2005 | Palin et al. | |
| 2005/0177639 A1 | 8/2005 | Reunamaki et al. | |
| 2005/0185628 A1 | 8/2005 | Watanabe et al. | |
| 2005/0185669 A1 | 8/2005 | Welborn et al. | |
| 2005/0201308 A1 | 9/2005 | Sekiya et al. | |
| 2005/0220201 A1 | 10/2005 | Laroia et al. | |
| 2005/0226175 A1 | 10/2005 | Gupta et al. | |
| 2005/0227692 A1 | 10/2005 | Kawashima et al. | |
| 2005/0227698 A1 * | 10/2005 | Nonin et al. | 455/452.2 |
| 2005/0233742 A1 | 10/2005 | Karaoguz et al. | |
| 2005/0233746 A1 | 10/2005 | Laroia et al. | |
| 2005/0238083 A1 | 10/2005 | Laroia et al. | |
| 2005/0243782 A1 * | 11/2005 | Sakoda et al. | 370/338 |
| 2005/0250469 A1 | 11/2005 | Laroia et al. | |
| 2005/0254435 A1 | 11/2005 | Moakley et al. | |
| 2005/0265218 A1 | 12/2005 | Molisch et al. | |
| 2005/0265221 A1 | 12/2005 | Batra et al. | |
| 2005/0276243 A1 | 12/2005 | Sugaya et al. | |
| 2005/0281320 A1 | 12/2005 | Neugebauer | |
| 2005/0286477 A1 | 12/2005 | Gupta et al. | |
| 2006/0013160 A1 | 1/2006 | Haartsen | |
| 2006/0014542 A1 | 1/2006 | Khandekar et al. | |
| 2006/0019660 A1 * | 1/2006 | Li | 455/434 |
| 2006/0020556 A1 | 1/2006 | Hamnen | |
| 2006/0023686 A1 | 2/2006 | Jeong et al. | |
| 2006/0025151 A1 | 2/2006 | Karaoguz et al. | |
| 2006/0031583 A1 | 2/2006 | Fujii et al. | |

(56) References Cited

U.S. PATENT DOCUMENTS

| | | |
|---|---|---|
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0087423 A1* | 4/2006 | Coronel et al. ............ 340/539.1 |
| 2006/0088010 A1 | 4/2006 | Buchwald et al. |
| 2006/0089099 A1* | 4/2006 | Buchwald et al. ........... 455/41.2 |
| 2006/0094456 A1 | 5/2006 | Rittle et al. |
| 2006/0105741 A1 | 5/2006 | Suh et al. |
| 2006/0111104 A1* | 5/2006 | Hyslop .................... 455/435.1 |
| 2006/0114853 A1 | 6/2006 | Hasty et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1* | 6/2007 | Van Niekerk et al. ........ 455/557 |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0069072 A1 | 3/2008 | Callaway et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |
| 2013/0343283 A1 | 12/2013 | Laroia |

FOREIGN PATENT DOCUMENTS

| | | |
|---|---|---|
| CN | 1371583 A | 9/2002 |
| CN | 1397117 A | 2/2003 |
| CN | 1411237 | 4/2003 |
| CN | 1578314 A | 2/2005 |
| CN | 1596005 A | 3/2005 |
| CN | 1650594 A | 8/2005 |
| CN | 1663156 | 8/2005 |
| CN | 1689345 A | 10/2005 |
| CN | 1909386 A | 2/2007 |
| EP | 0469659 A1 | 2/1992 |
| EP | 0776134 A2 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 A1 | 3/2008 |
| EP | 2312885 A1 | 4/2011 |
| GB | 232251 A1 | 3/1926 |
| GB | 2375014 A1 | 10/2002 |
| GB | 2410653 A | 8/2005 |
| JP | 7023465 | 1/1995 |
| JP | 07143567 | 6/1995 |
| JP | 8307934 | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2001118191 A | 4/2001 |
| JP | 2002502164 A | 1/2002 |
| JP | 2002112347 A | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003258703 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004180297 A | 6/2004 |
| JP | 2004242187 A | 8/2004 |
| JP | 2004247820 A | 9/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |

(56) References Cited

FOREIGN PATENT DOCUMENTS

| | | | |
|---|---|---|---|
| JP | 2005086234 A | 3/2005 | |
| JP | 2005086408 | 3/2005 | |
| JP | 200512412 A | 5/2005 | |
| JP | 2005136529 A | 5/2005 | |
| JP | 2005151525 A | 6/2005 | |
| JP | 2005167502 A | 6/2005 | |
| JP | 2005210703 A | 8/2005 | |
| JP | 2005223722 A | 8/2005 | |
| JP | 2005223767 A | 8/2005 | |
| JP | 2005523616 A | 8/2005 | |
| JP | 2005236819 A | 9/2005 | |
| JP | 2005244698 A | 9/2005 | |
| JP | 2005252645 A | 9/2005 | |
| JP | 2005253038 A | 9/2005 | |
| JP | 2005253047 A | 9/2005 | |
| JP | 2005277599 A | 10/2005 | |
| JP | 2005277815 A | 10/2005 | |
| JP | 2005295400 | 10/2005 | |
| JP | 2005328231 | 11/2005 | |
| JP | 2005348203 | 12/2005 | |
| JP | 2005354326 A | 12/2005 | |
| JP | 2005537762 T | 12/2005 | |
| JP | 2006005792 A | 1/2006 | |
| JP | 2006501777 A | 1/2006 | |
| JP | 2007525891 A | 9/2007 | |
| JP | 2008507219 T | 3/2008 | |
| JP | 2008228128 A | 9/2008 | |
| KR | 960012088 B1 | 9/1996 | |
| KR | 100225765 B1 | 10/1999 | |
| KR | 20000035806 A | 6/2000 | |
| KR | 10362135 | 11/2002 | |
| KR | 20030024435 A | 3/2003 | |
| TW | 545006 B | 8/2003 | |
| TW | I239782 | 9/2005 | |
| TW | M286515 | 1/2006 | |
| TW | I250742 | 3/2006 | |
| TW | M292848 | 6/2006 | |
| WO | WO9701256 | 1/1997 | |
| WO | WO9749258 | 12/1997 | |
| WO | WO9808321 | 2/1998 | |
| WO | WO0074429 | 12/2000 | |
| WO | WO0101717 A1 | 1/2001 | |
| WO | 0192992 A2 | 12/2001 | |
| WO | 0223758 | 3/2002 | |
| WO | WO0249387 A1 | 6/2002 | |
| WO | 0278271 A1 | 10/2002 | |
| WO | 02078271 A1 | 10/2002 | |
| WO | 02082742 A1 | 10/2002 | |
| WO | 02091623 A1 | 11/2002 | |
| WO | WO03001742 | 1/2003 | |
| WO | 03017596 A2 | 2/2003 | |
| WO | 03039054 | 5/2003 | |
| WO | WO-03039064 A1 | 5/2003 | |
| WO | WO03090037 A2 | 10/2003 | |
| WO | 2004012464 A2 | 2/2004 | |
| WO | 2004019529 A2 | 3/2004 | |
| WO | WO2004023241 A2 | 3/2004 | |
| WO | 2004032536 A2 | 4/2004 | |
| WO | WO2004047348 A1 | 6/2004 | |
| WO | WO2004066646 A1 | 8/2004 | |
| WO | WO2004071022 A1 | 8/2004 | |
| WO | 2004080103 A1 | 9/2004 | |
| WO | WO2004077920 A2 | 9/2004 | |
| WO | WO2005013529 | 2/2005 | |
| WO | 2005022846 A1 | 3/2005 | |
| WO | WO2005020517 | 3/2005 | |
| WO | WO2005027556 A1 | 3/2005 | |
| WO | 2005038606 A2 | 4/2005 | |
| WO | 2005039105 A1 | 4/2005 | |
| WO | WO2005034433 A1 | 4/2005 | |
| WO | 2005053346 A1 | 6/2005 | |
| WO | 2005053347 A1 | 6/2005 | |
| WO | WO2005053253 | 6/2005 | |
| WO | WO2005060209 A1 | 6/2005 | |
| WO | WO2005062552 A1 | 7/2005 | |
| WO | 2005071998 A1 | 8/2005 | |
| WO | 2005076543 A1 | 8/2005 | |
| WO | WO2005079012 A1 | 8/2005 | |
| WO | 2005109657 A1 | 11/2005 | |
| WO | 2005117463 A1 | 12/2005 | |
| WO | WO2005119478 | 12/2005 | |
| WO | 2006000617 A1 | 1/2006 | |
| WO | 2006007946 A1 | 1/2006 | |
| WO | WO-2006006138 A1 | 1/2006 | |
| WO | WO2006057815 | 6/2006 | |
| WO | WO2006138122 A2 | 12/2006 | |
| WO | 2007038896 A2 | 4/2007 | |
| WO | WO2008014336 A2 | 1/2008 | |
| WO | 2008020162 A2 | 2/2008 | |
| WO | 2008072346 A1 | 6/2008 | |

OTHER PUBLICATIONS

Written Opinion—PCT/US2007/060351, International Search Authority—European Patent Office—May 25, 2007.
International Preliminary Report on Patentability—PCT/US2007/060351, International Search Authority—The International Bureau of WIPO—Geneva, Switzerland—Jul. 15, 2008.
Costa-Requena J et al: "Incentive Problem for Ad Hoc Networks Scalability" Autonomic and Autonomous Systems and International Conference on Networking and Services, 2005. ICAS-ICNS 2005. Joint International Conference on Papette, Tahiti Oct. 23-28, 2005, Piscataway, NJ, USA, IEEE, Oct. 23, 2005, pp. 70-70, XP010864809.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].
Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337: XP-10855130A.
Cabric D et al: "Implementation Issues in Spectrum Sensing for Cognitive Radios" Signals, Systems and Computers, 2004. Conference Record of the Thirty- Eighth Asilomar Conference on Pacific Grove, CA Nov. 7-10 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.
IEEE Computer Society, Part 15.4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.
IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111,116 to 117, 170 to 171,and 204 to206.
Taiwan Search Report—TW096101113—TIPO—May 23, 2011 (060645U12TW).
Wada, Y. et al., "Consideration of OFDM Cellular System Using Single Band", IEICE Year 2002 Communication Society Convention Lecture Papers 1, Sep. 10-13, 2002, p. 355, B-5-58.
Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

(56) References Cited

OTHER PUBLICATIONS

Hlavacs H., et al., "Enhancing ZRTP by using Compuatational Puzzles", Journal of Universal Computer Science, Feb. 28, 2008, vol. 14 No.5, pp. 693-716.

Kim S., et al., "Reliable transfer on wireless sensor networks", IEEE SECON 2004-IEEE, 2004, pp.449-459.

Yanchao Zhang, Wei Liu, Wenjing Lou, Yuguang Fang; Anonymous Handshakes in Mobile AD HOC Networks; MILCOM 2004-2004 IEEE Military Communications Conference; pp. 1193-1199; XP-002432989.

Hung-Yu Wei, Richard D. Gitlin; Incentive Scheduling for Cooperative Relay in WWAN/WLAN Two-Hop-Relay Network; IEEE Communications Society/WCNC 2005; pp. 1696-1701.

Niels Hoven, Anant Sahai; Power Scaling for Cognitive Radio; 2005 International Conference on Wireless Networks, Communications and Mobile Computing; pp. 250-255.

Jose Costa-Requena, Raimo Kantola, Nicklas Beijar; Incentive, 2005.

Carlos Cordeiro, Kiran Challapali, Dagnachew Birru, Sai Shankar; IEEE 802.22: The First Worldwide Wireless Standard Based on Cognitive Radios; 2005 IEEE; pp. 328-337: XP-10855130A.

Cabric D et al: "Implementation Issues in Spectrum Sensing for Cognitive Radios" Signals, Systems and Computers, 2004. Conference Record of the Thirty-Eighth Asilomar Conference on Pacific Grove, CA Nov. 7-10, 2004 pp. 772-776 XP-010781056.

Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,-XP-001208676.

Spyridon Panagiotakis et al: "Intelligent Service Mediation for Supporting Advanced Location and Mobility-Aware Service Provisioning in Reconfigurable Mobile Networks" IEEE Personal Communications, Oct. 2002 pp. 28-38, XP-011093874.

Dagres et al., "Flexible Radio: A General Framework With Phy-Layer Algorithm-Design Insights" Eurocon 2005, Nov. 22-24, 2005 pp. 120-123, XP-10916036.

Van De Beek, "Ml Estimation of Time and Frequency Offset in OFDM Systems" IEEE Transactions on Signal Processing, vol. 45 No. 7 Jul. 1997, XP-11057861.

Brandes S et al: "Reduction of Out-Of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.

\* cited by examiner

COMMUNICATION METHODS AND APPARATUS WHICH MAY BE USED IN THE ABSENCE OR PRESENCE OF BEACON SIGNALS

RELATED APPLICATIONS

The present application claims the benefit of U.S. Provisional Patent Application Ser. No. 60/758,011 filed on Jan. 11, 2006, titled "METHODS AND APPARATUS FOR USING BEACON SIGNALS FOR IDENTIFICATION, SYNCHRONIZATION OR ACQUISITION IN AN AD HOC WIRELESS NETWORK", U.S. Provisional Patent Application Ser. No. 60/758,010 filed on Jan. 11, 2006, titled "METHODS AND APPARATUS FOR FACILITATING IDENTIFICATION, SYNCHRONIZATION OR ACQUISITION USING BEACON SIGNALS", U.S. Provisional Patent Application Ser. No. 60/758,012 filed on Jan. 11, 2006, titled "METHODS AND APPARATUS FOR USING BEACON SIGNALS IN A COGNITIVE RADIO NETWORK". U.S. Provisional Patent Application Ser. No. 60/863,304 filed on Oct. 27, 2006, U.S. Provisional Patent Application Ser. No. 60/845,052 filed on Sep. 15, 2006, and U.S. Provisional Patent Application Ser. No. 60/845,051 filed on Sep. 15, 2006, each of which is hereby incorporated by reference and all of which are assigned to the assignee hereof.

FIELD

The present invention is directed to methods and apparatus for signaling in wireless communication and, more particularly, to methods and apparatus for using beacon signals for detecting spectrum availability in a radio network, e.g., a cognitive radio network.

BACKGROUND

Wireless spectrum is an expensive and valuable resource but significant portions of spectrum often go unused. The concept of cognitive radio allows wireless devices to discover and use locally available and usable spectrum for communication. The wireless device should be able to sense its environment, including its location, and then be able to alter its communication parameters, including power and carrier frequency, so as to dynamically reuse available spectrum. A key technical challenge of cognitive radio is to detect the availability of the spectrum in a robust and power efficient manner. For example, when a terminal just powers up or moves into a new area, the terminal may not have knowledge of the communication parameters or even technologies that may be currently used in the vicinity of the geographical area. The detection method has to be robust, e.g., against various uncertainties including the lack of timing and frequency synchronization. Power efficiency has great impact on the battery life of the terminals and is thus another important issue in wireless systems.

In view of the above discussion, it should be appreciated that there is a need for new and improved ways for detecting spectrum availability in a radio network.

SUMMARY

In accordance with various embodiments, before a wireless terminal starts to use a spectrum band, the wireless terminal is to scan a spectrum band to determine whether the spectrum band is available for use. The step of scanning includes searching for a beacon signal in the spectrum band.

In one exemplary embodiment, a beacon signal includes a sequence of beacon signal bursts in a spectrum band, each beacon bust including one or more beacon symbols. A beacon symbol is transmitted using a beacon symbol transmission unit. A beacon signal burst includes one or more beacon symbols with the number of beacon symbols occupying a small fraction of the beacon symbol transmission units of the beacon symbol burst, e.g., ≤10%. In some exemplary orthogonal frequency division multiplexing (OFDM) systems, each beacon symbol is a single tone over an OFDM symbol period. In some exemplary orthogonal frequency division multiplexing (OFDM) systems, each beacon symbol is a single tone over a small number, e.g., one, two, three or four, OFDM symbol periods. A beacon signal burst, in some embodiments, includes one or more tones e.g., a single tone or a small number of tones such as two three or four tones, which are used to convey beacon symbols over a small number of transmission symbol time periods, e.g., one or two symbol transmission time periods. The beacon signal bursts are transmitted in an intermittent (i.e., non-continuous) manner so that there are a number of symbol periods between a first and a second beacon signal bursts. Successive beacon signal bursts may, and sometimes do, use different tones for the beacon symbols according to a predetermined or pseudo random tone hopping sequence.

In accordance with various embodiments, a beacon signal can be used to carry a small amount of information. In an exemplary OFDM system, information can be contained in the frequency of the tone(s) of the beacon symbol in a given burst, the time interval between successive bursts, and/or the tone hopping sequence. The information carried by the beacon signal, in various embodiments, includes at least one of the following about the transmitter: the identifier, the type, the priority level, the current transmission power value, and maximum power information, e.g., the maximum power that the transmitter is capable of transmitting.

If the wireless terminal has not detected any beacon signal in the step of searching for a beacon signal, then, in some embodiments, the spectrum band is available to be used by the terminal. Otherwise, in one embodiment, the wireless terminal is not allowed to use the spectrum band.

If the wireless terminal determines that a candidate spectrum band is available for use, the wireless terminal may start to use the spectrum, e.g., transmitting/receiving data or control signals or establishing peer-to-peer communication sessions with another wireless terminal. In one embodiment, the transmission power of the wireless terminal is a function of the type or the priority level of the wireless terminal.

In accordance with one aspect of various embodiments, while the wireless terminal is using the spectrum, the wireless terminal transmits its own user beacon signal in the spectrum band. The user beacon signals transmitted by different wireless terminals may be, and sometimes are, different from each other with information carried by the beacon signals. In one embodiment, wireless terminals are of different service priority levels and correspond to different user beacon signals.

In accordance with another aspect of various embodiments, while the wireless terminal is using the spectrum, the wireless terminal listens to the spectrum and attempts to detect a beacon signal, which may be sent by another wireless terminal. The wireless terminal may continuously be in the listening mode (i.e., on time) for a time interval of a few symbol periods. The on time is followed by an off time during which the terminal is in a power saving mode and does not receive any signal, e.g., turn off the receive modules. Alternatively, the wireless terminal may continuously be in the listening mode while the wireless terminal is using the spectrum.

In one embodiment, when a first wireless terminal detects the presence of a user beacon signal from a second wireless terminal, irrespective of whether the first wireless terminal is currently using the spectrum band or not, the wireless terminal needs to compare the priority level. If the priority level of the second wireless terminal is higher, the first wireless terminal considers the spectrum band unavailable for use. Moreover, the first wireless terminal shall stop using the spectrum band if the first wireless terminal is currently using the spectrum band, so that higher priority users or services can use the spectrum band without the interference from the first wireless terminal. If the priority level of the second wireless terminal is lower, the first wireless terminal considers the spectrum band available for use. If the first wireless terminal has not been using the spectrum, the first wireless terminal may start to transmit its own user beacon signal. In some embodiments, the first wireless terminal derives the timing and/or frequency of the second wireless terminal from the detected beacon signal, and then uses that information to determine the timing and/or frequency to transmit its own user beacon signal. Assuming that the second wireless terminal is also listening to detect a user beacon signal, advantageously, the above synchronization helps the user beacon signal of the first wireless terminal to be received by the second wireless terminal, so that the second wireless terminal will stop using the spectrum.

In accordance with another aspect of various embodiments, the wireless terminal estimates the path loss between the wireless terminal and the corresponding transmitter of the detected beacon signal. The estimation can be, and sometimes is, based on the received power of the beacon signal. If the path loss is sufficiently great, e.g., greater than a predetermined level, then the wireless terminal can use the spectrum band.

In accordance with various embodiments, in a geographic area, if any communication mode e.g., wireless terminal or base station, is in a data session in a spectrum band, then the node is required to transmit a node beacon signal in the spectrum band. In the data session, the mode may be transmitting or receiving control or data signals. In the area, different modes may co-exist, with each wireless terminal using at least one of a variety of services, such as cellular phone, wireless local loop, digital television, etc., which may be supported by different technologies.

An exemplary method of operating a wireless communications devices, in accordance with various embodiments includes: monitoring during a first period of time to detect at least a portion of a beacon signal including at least one beacon signal in a first communications band; and when a beacon signal portion including at least one beacon symbol is not detected during said first period of time, transmitting a first signal during a second period of time following said first period of time. An exemplary wireless communications device in accordance with various embodiments includes: a beacon detections module for detecting receipt of at least one beacon symbol communicated in a first communications band; a transmitter; and a transmission control module for controlling signal transmission as a function of an output of said beacon detection module, said transmission control module controlling said transmitter to transmit a first signal during a second period of time following a first period of time when a beacon signal portion including at least one beacon symbol is not detected during said first period of time.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
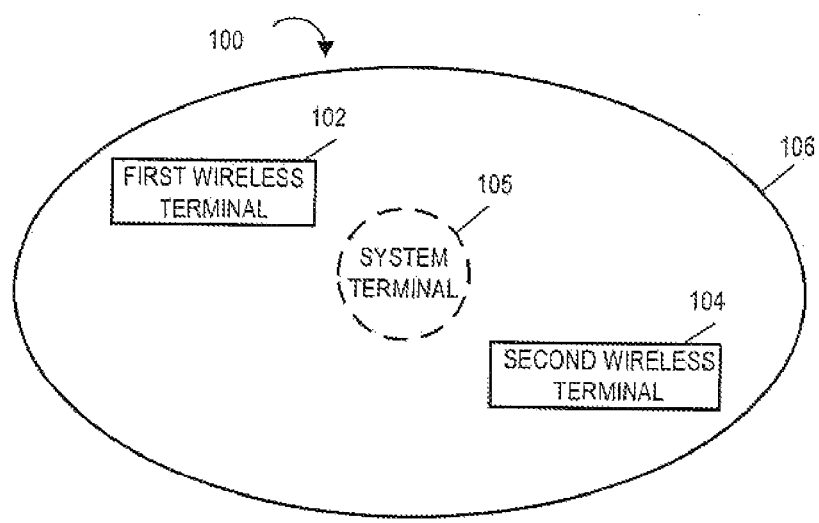
FIG. 1 illustrates an exemplary cognitive radio network in a geographic area implemented in accordance with various embodiments.

FIG. 1 illustrates an exemplary cognitive radio communication network 100 implemented in accordance with various embodiments. Two wireless terminals, namely a first wireless terminal 102 and a second wireless terminal 104 are present in a geographic area 106. A system terminal 105; e.g., including a system beacon transmitter, is included in some embodiments. Some spectrum band is available to be used by the two terminals for the purpose of communication, e.g., peer-to-peer communication.

In a cognitive radio network, there is usually no network infrastructure. Various described novel methods, apparatus and features may be used in various radio networks but are particularly well suited for use in networks where infrastructure is limited or lacking e.g., in a cognitive radio network where a wireless terminal may need to discover the information about the network. The wireless terminals may not have a common timing or frequency reference. Indeed, in such a network, the wireless terminals need to figure out whether a given spectrum band is available to be used by the wireless terminal in the current geographic area. A key idea of cognitive radio is to let a wireless terminal sense its environment and discover available spectrum. Spectrum availability is a function of the environment.

Figure 2:
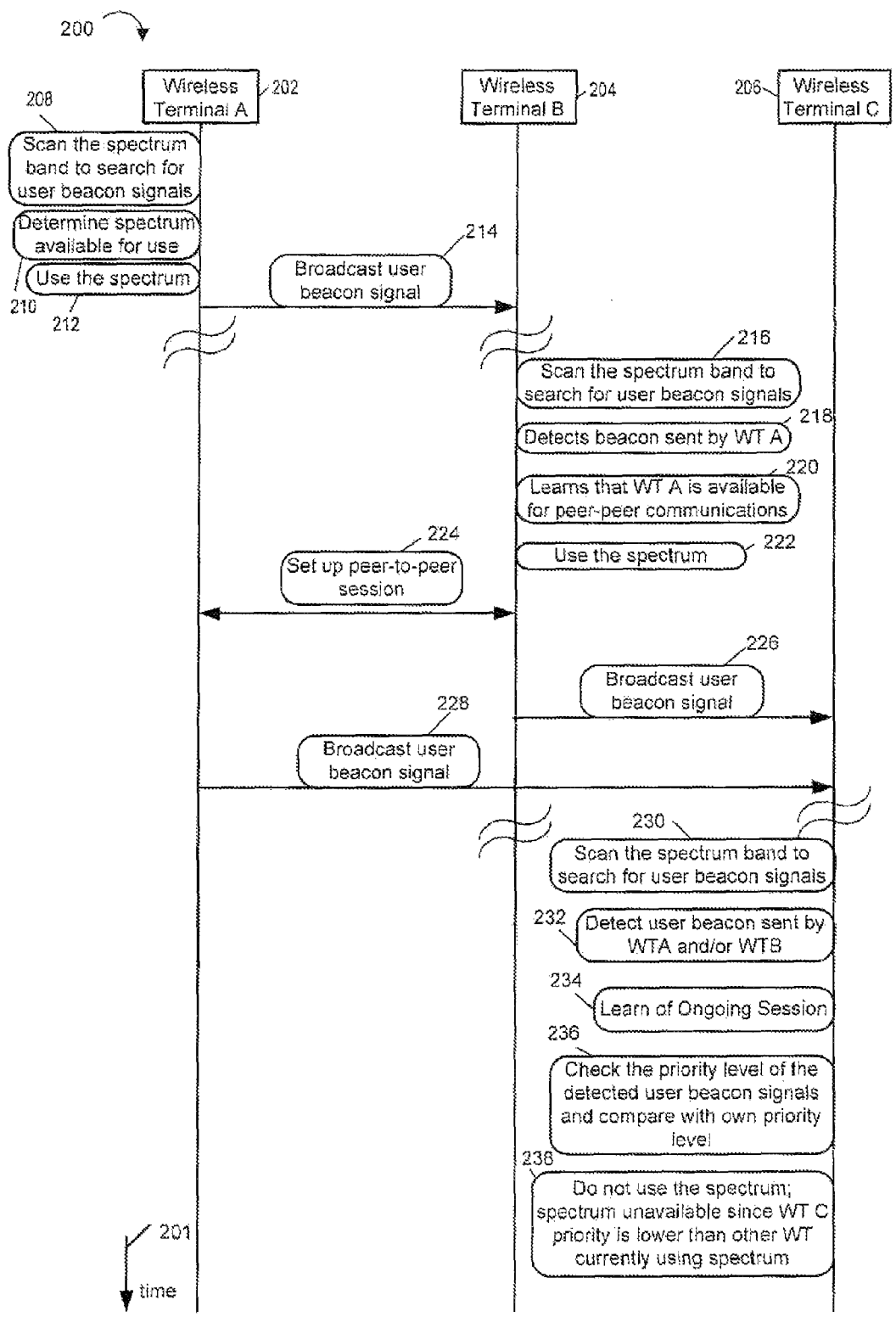
FIG. 2 illustrates a ladder diagram of an exemplary method of using beacon signals to control the use of the spectrum band in a cognitive radio network implemented in accordance with various embodiments.

FIG. 2 illustrates a ladder diagram 200 of an exemplary method of using beacon signals to control the use of the spectrum band in a cognitive radio network implemented in accordance with various embodiments.

The vertical axis 201 represents time. There are three exemplary terminals, WT A 202, WT B 204 and WT C 206 in this exemplary cognitive radio network. Assume that initially none of the wireless terminals (204, 206, 208) are powered on.

First, wireless terminal A 202 is powered on. Before wireless terminal A 202 can use the spectrum band, it first scans the band to search for user beacon signals (208). Since wireless terminal A 202 is the only active terminal in the area, it does not detect any user beacon signal. Thus, wireless terminal A 202 determines that the spectrum band is available for use (210). Wireless terminal A 202 starts to use the spectrum (212). Wireless terminal A 202 broadcasts its user beacon signal to show its presence (214).

At a later time, wireless terminal B 204 is powered on. Before wireless terminal B 204 can use the spectrum band, it first scans the band to search for user beacon signals (216). Wireless terminal B 204 detects the user beacon signal sent by terminal A (218). Wireless terminal B 204 furthermore learns, e.g., from the detected beacon signal or another broadcast channel of wireless terminal A, that wireless terminal A is available for peer-to-peer communication (220). So wireless terminal B 204 determines to use the spectrum (222). Wireless terminals A and B (202, 204) set up a peer-to-peer session (224). Since both wireless terminals (202, 204) are active, they both broadcast user beacon signals (228 and 226), respectively. In some embodiments, either wireless terminal broadcasts its own user beacon signal. In other embodiments, the two terminals (202, 204) determine the priority level of their sessions and use that to determine the user beacon signals to be sent. For example, the session priority level is the maximum priority level of either terminal.

At a later time, wireless terminal C 206 is powered on. Before wireless terminal C 206 can use the spectrum band, it first scans the band to search for user beacon signals (230). Wireless terminal C 206 detects the user beacon signal sent by wireless terminal A 202 and/or by wireless terminal B 204 (232). Wireless terminal C 206 furthermore learns, e.g., from the detected beacon signal or another broadcast channel of wireless terminal A or B, that there is an ongoing session (234). Wireless terminal C 206 also learns the priority levels of detected beacon signals and compares them with its own priority level (236). If the priority level of wireless terminal C 206 is lower, then wireless terminal C 206 determines that the spectrum band is not available (238); otherwise wireless terminal C 206 may start to transmit its own user beacon signal. In such a case, both wireless terminals A and B (202, 204) will detect the user beacon signal from wireless terminal C 206, and have to stop/suspend their session and stop using the spectrum.

Figure 3:
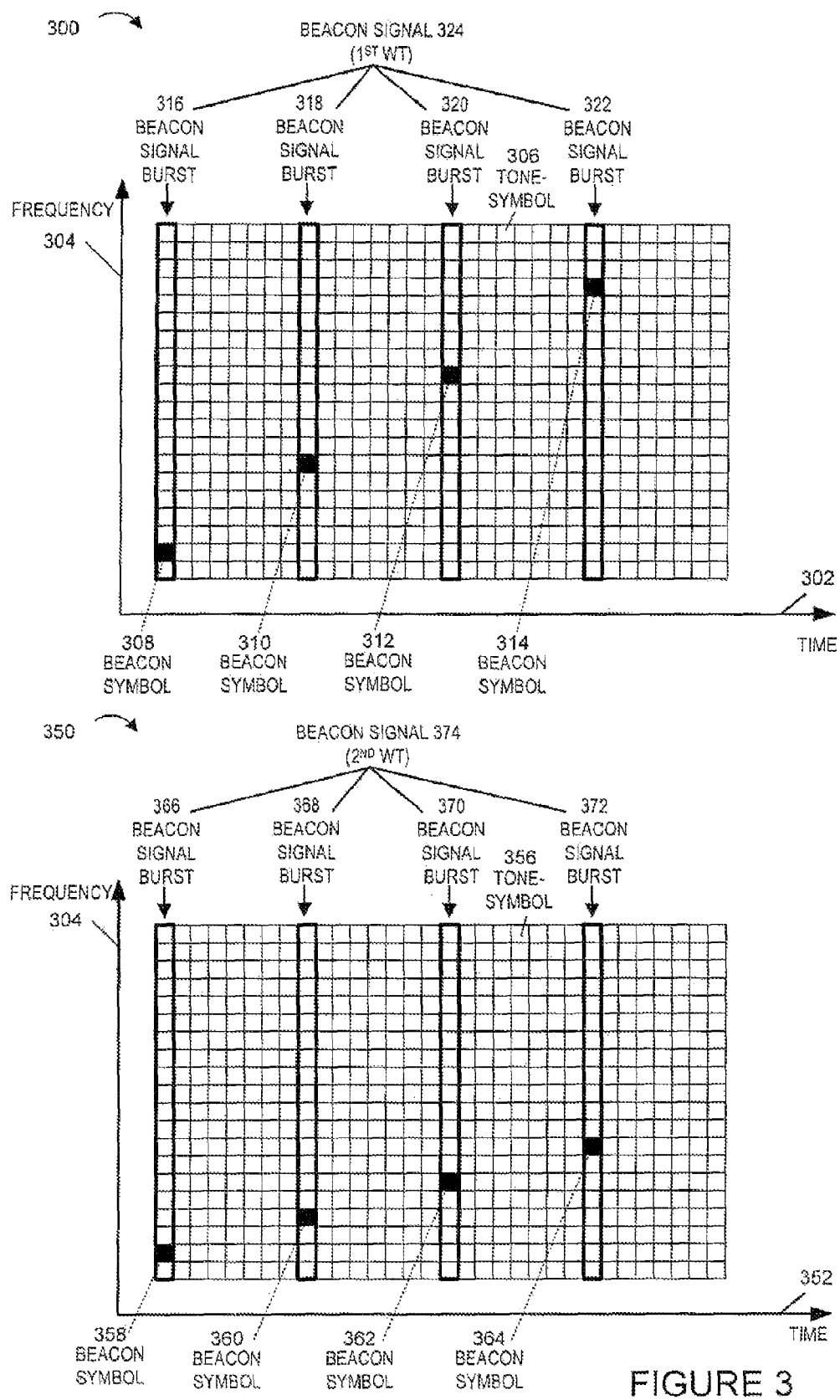
FIG. 3 illustrates different exemplary beacon signals, e.g., system and/or user beacon signals, implemented in accordance with various embodiments.

In accordance with various embodiments, a beacon signal includes a sequence of beacon signal bursts in a spectrum band, each beacon signal burst including one or more beacon symbols. A beacon symbol is transmitted using a beacon symbol transmission unit. A beacon signal burst includes a small number of beacon symbols, with the number of beacon symbols occupying a small fraction of the beacon symbol transmission units of the beacon signal burst. In some exemplary OFDM systems, a beacon symbol is a tone over an OFDM symbol period. In some exemplary OFDM systems, a beacon symbol is a tone over a small number, e.g., one, two, three, or four of successive, OFDM symbol periods. In some embodiments, a beacon signal burst includes one or more tones, e.g., a single tone or a small number such as two, three or four tones, which are used to convey beacon symbols, over a small number of transmission symbol periods, e.g., one or two symbol periods. The wireless transmitter transmits the beacon signal bursts in an intermittent (i.e., non-continuous) manner so that there are a number of symbol periods between a first and a second beacon signal bursts. FIG. 3 illustrates in drawing 300 and 350 exemplary beacon signals in an exemplary OFDM system.

In drawing 300 the horizontal axis 302 represents time and the vertical axis 304 represents frequency. A vertical column represents each of the tones in a given symbol period. Each small box 306 represents a tone-symbol, which is a single tone over a single transmission symbol period. In drawing 350 the horizontal axis 352 represents time and the vertical axis 304 represents frequency. A vertical column represents each of the tones in a given symbol period. Each small box 356 represents a tone-symbol, which is a single tone over a single transmission symbol period. A minimum transmission unit in the OFDM symbol is a tone-symbol. In this exemplary embodiment, a beacon symbol transmission unit is an OFDM tone-symbol.

The beacon signal includes a sequence of beacon signal bursts, which are transmitted sequentially over time, each beacon symbol burst including one or more beacon symbols. A beacon signal burst, in various embodiments, includes a small number of tones which convey beacon symbols, e.g., a single tone, over a small number of transmission symbol periods, e.g., one or two symbol periods. Drawing 300 of FIG. 3 shows four small black boxes (308, 310, 312, 314), each of which represents a beacon symbol. In this case, a beacon symbol uses the air link resources of one tone-symbol. In another exemplary embodiment, a beacon symbol uses one tone transmitted over two consecutive symbol periods and uses the air link resource of two OFDM tone-symbols.

The beacon symbol tone or tones of the beacon signal may vary (hop) from one burst to another. In accordance with various embodiments, the tone-hopping pattern, including the tones used for the beacon symbol or symbols and the inter-burst interval, of the beacon signal are, in some embodiments, a function of the transmitter, e.g., a terminal, and can be used as an identification of the transmitter or an identification of the type to which the transmitter belongs, or to indicate the transmission power or the power capability of the terminal.

Different user beacon signals are, in some embodiments, different from each other in at least one of the following ways: the periodicity of the beacon signal bursts, the tone or tones used for the beacon symbols in a beacon signal burst, and the hopping pattern of the beacon symbol tones used in successive beacon signal bursts.

For example, FIG. 3 shows two exemplary beacon signals (324, 374). Consider that first beacon signal 324 is a first user beacon signal is sent by a first wireless terminal and includes beacon signal burst (316, 318, 320, 322) and beacon symbols (308, 310, 312, 314), respectively. The second beacon signal 374 sent by a second wireless terminal includes beacon signal bursts (366, 368, 370, 372) and beacon symbols (358, 360, 362, 364), respectively. The upper portion 300 shows a user beacon signal 324 sent by one wireless terminal, and the lower portion 350 shows another user beacon signal 374 sent by another wireless terminal. In the example, the two beacon signals have the same periodicity, but different tone hopping sequences. Specifically, the tones of the exemplary first wireless terminal beacon signal 324 follow a first slope, and the tones of the exemplary second wireless terminal user beacon signal 374 follow a second slope, where the first slope is greater than the second slope.

In some embodiments exemplary system beacon signals, e.g., beacon signals from base stations and/or fixed location beacon transmitters, follow a first slope or first set of slopes and exemplary user beacon signals follow a second slope or second set of slopes, the first slope being different from the second slope and/or the first set of slopes being non-overlapping with the second set of slopes.

In one exemplary embodiment, suppose that a high priority service, e.g., law enforcement or fire department service, and a low priority service, e.g., general data service, share the spectrum band. Most of time, the high priority service does not have any activity, during which the spectrum band can be used entirely by the low priority service. However, when the high priority service needs to use the spectrum, it is desired that the low priority service shall stop. The sessions associated with the low priority service shall be terminated. To achieve this objective, in accordance with various embodiments, terminals associated with different service levels use different user beacon signals, e.g., to signal different priority levels.

Consider an exemplary embodiment. When the wireless terminal is scanning the spectrum band for availability, or when the wireless terminal has already been in a communication session using the spectrum band, the wireless terminal shall keep on searching for user beacon signals. If the wireless terminal detects the presence of a user beacon signal with higher priority than its own, then the wireless terminal considers the corresponding spectrum band as unavailable for use. The wireless terminal shall terminate the communication session, if any, and may proceed to scan another candidate spectrum band. This results in clean spectrum band to be used by high priority terminals or services.

Figure 4:
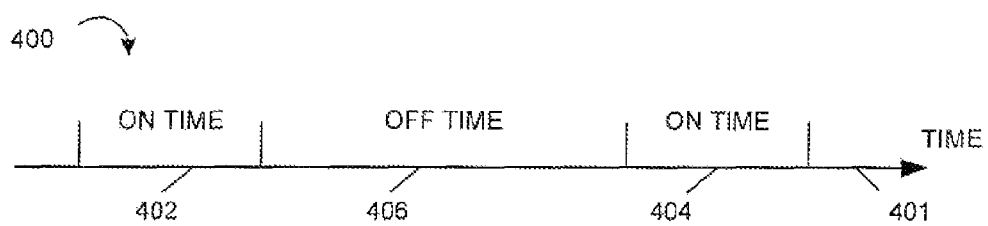
FIG. 4 illustrates an example of utilizing timing synchronization information implemented in accordance with various embodiments.

Drawing 400 of FIG. 4 illustrates one embodiment of monitoring for beacon signal bursts implemented in accordance with various embodiments. The wireless terminal listens to the spectrum band and attempts to detect a user beacon signal, which may be sent by a different wireless terminal. The wireless terminal may continuously be in the listening mode for a time interval of a few symbol periods, which is called on time. The on time (402) is followed by an off time (406) during which the wireless terminal is in a power saving mode and does not receive any signal. In the off time, the wireless terminal may completely turn off the receive modules. When the off time 406 ends, the wireless terminal resumes to the on time 404 and starts to detect for beacon signals again. The above procedure repeats.

In some embodiments, the length of an on time interval is shorter than that of an off time internal. In one embodiment, an on time interval is less than or equal to ⅕ of an off time interval. In one embodiment, the length of each of the on time intervals are the same, and the length of each of the off time intervals are also the same.

The length of an off time interval depends, in some embodiments, on the latency requirement for a first wireless terminal to detect the presence of another (second) wireless terminal if the second wireless terminal is actually present in the vicinity of the first wireless terminal. The length of an on time interval is determined so that the first wireless terminal has a great probability of detecting a least one beacon signal burst in the on time interval. In one embodiment, the length of the on time interval is a function of at least one of the transmission duration of a beacon signal burst and the duration between successive beacon signal bursts. For example, the length of the on time interval is at least the sum of the transmission duration of a beacon signal burst and the duration between successive beacon signal bursts.

Figure 5:
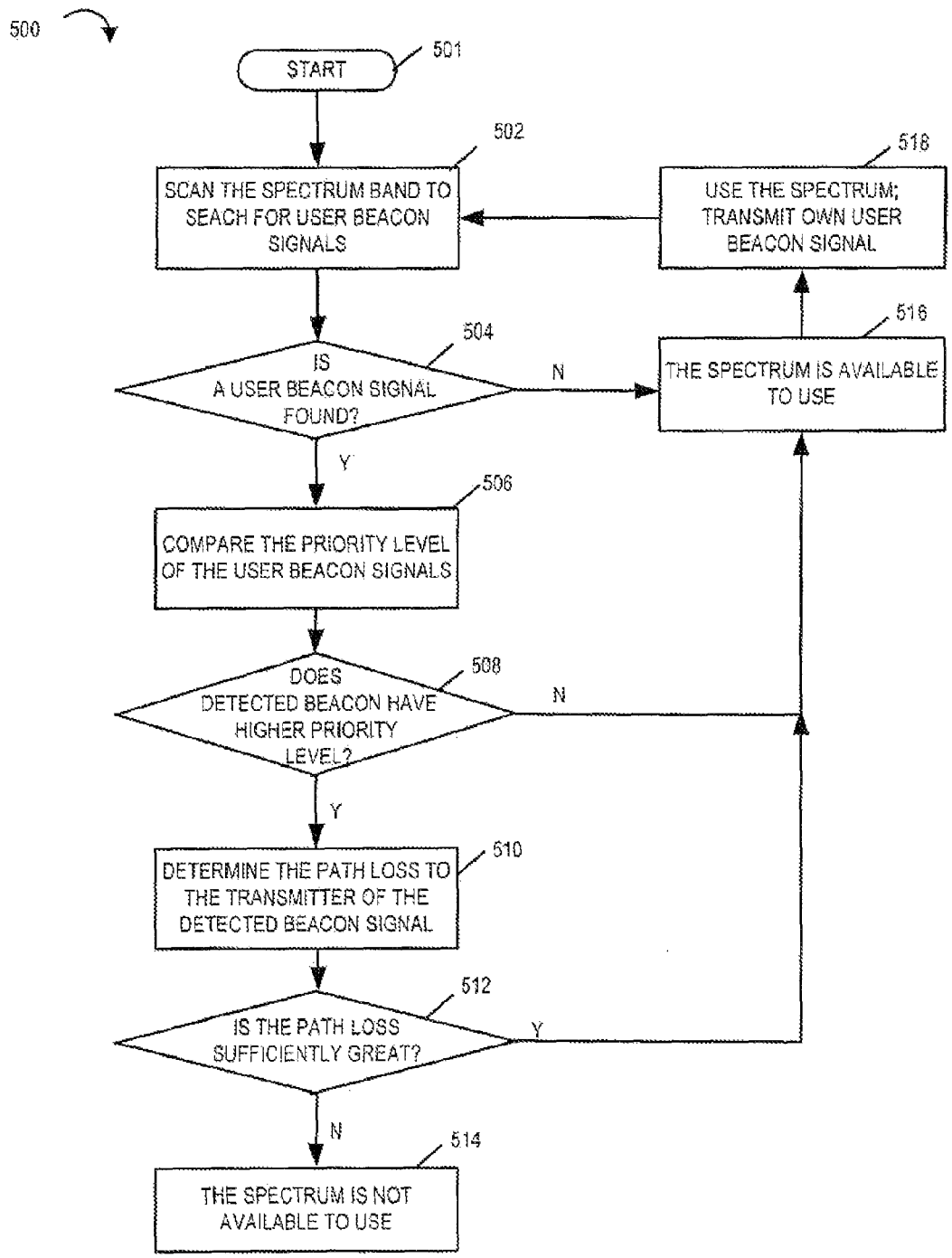
FIG. 5 illustrates a flowchart of a method used by an exemplary wireless terminal implemented in accordance with various embodiments.

FIG. 5 illustrates a flowchart 500 of an exemplary method of operating a wireless terminal used by an exemplary first wireless terminal implemented in accordance with various embodiments. Operation of the exemplary method starts in step 501, where the first wireless terminal is powered on and initialized, and proceeds to step 502.

In step 502, the exemplary first wireless terminal may start by scanning the spectrum band to search for user beacon signals. Then, in step 504, the first wireless terminal checks whether a user beacon signal from a second wireless terminal has been detected. If the answer is NO, then operation proceeds from step 504 to step 516, where the first wireless terminal determines that the spectrum is available for use. Otherwise, the first wireless terminal has found a beacon signal and operation proceeds from step 504 to step 506, where the first wireless terminal compares the priority level of the detected user beacon signal with its own priority level. In step 508, the first wireless terminal checks whether the detected beacon has higher priority level than its own priority level. If the answer is NO, then operation proceeds from step 508 to step 516, where the first wireless terminal determines that the spectrum is available for use. Otherwise, operation proceeds from step 508 to step 510. In step 510 the first wireless terminal determines the path loss from the first wireless terminal to the second wireless terminal.

In one embodiment, the beacon signal carries the information about the transmission power of the second wireless terminal. Then the first wireless terminal can determine the path loss from the transmission power and the received power measured by the first wireless terminal. In a special case where each of the beacon signals are sent at the same power level, the beacon signal itself does not have to carry the information about the transmission power of the second wireless terminal. The first wireless terminal can determine the path loss from the known, e.g., predetermined beacon level, transmission power and the received power measured by the first wireless terminal. Operation proceeds from step 510 to step 512.

In step 512, the first wireless terminal determines whether the path loss is sufficiently high e.g., in relation to a predetermined stored path loss level. If the answer is yes, then operation proceeds from step 512 to step 516. In step 516 the first wireless terminal determines that the spectrum is available for use. Otherwise, operation proceeds from step 512 to step 514, where the first wireless terminal determines that the spectrum is not available for use.

Once the first wireless terminal determines that the spectrum is available for use in step 516, the first wireless terminal may use the spectrum to establish communication links, e.g., peer-to-peer communication. Operation proceeds from step 516 to step 518 in which the first wireless terminal starts to use the spectrum including transmitting its own user beacon signal. Meanwhile, the first wireless terminal shall periodically be in the on time mode, e.g., with respect to receiver operation, and scan the spectrum band to search for user beacon signals as indicated by step 502.

Usually the terminals in the cognitive radio network not have a common source from which each of the terminals can derive synchronization information. In accordance with a feature of various exemplary embodiments, the wireless terminals use the timing and/or frequency information derived from a system beacon signal transmitted by a special transmitter, e.g., transmitted by a fixed location system terminal including a beacon transmitter. The fixed location system terminal may or may not be coupled to other network nodes, and may or may not include additional wireless functions in addition to transmitting the beacon signal. In some embodiments, the fixed location system terminal's sole function is to transmit a system beacon signal to be used as a reference by wireless terminals. Advantageously, the terminals now have a common timing and/or frequency reference, thereby being synchronized with each other. To elaborate, drawing 600 of FIG. 6 illustrates an example of utilizing timing synchronization information implemented in accordance with various embodiments.

The horizontal axis 601 represents time. A second wireless terminal transmits its user beacon signal 608, which includes a sequence of beacon signal bursts, 602, 604, 606, and so on. Now, suppose that a first wireless terminal is powered on and detects those beacon bursts. Assume that the first wireless terminal has higher priority level than the second terminal, and that the first wireless terminal intends to use the spectrum.

The first wireless terminal predicts the on time intervals of the second wireless terminal's receiver, during which the second wireless terminal monitors for other user beacon signal. The prediction is a function of the estimated timing of the detected beacon burst 602, 604 and 606. For example, in FIG. 6, the on time interval of a terminal starts from a time instance that has known time offset 612 from the beginning of a beacon signal burst sent by the same wireless terminal. Therefore, once the first wireless terminal has determined the timing of the beacon bursts of the second wireless terminal transmitter, it is possible to determine the timing of the second wireless terminal receiver from the known relationship.

Figure 6:
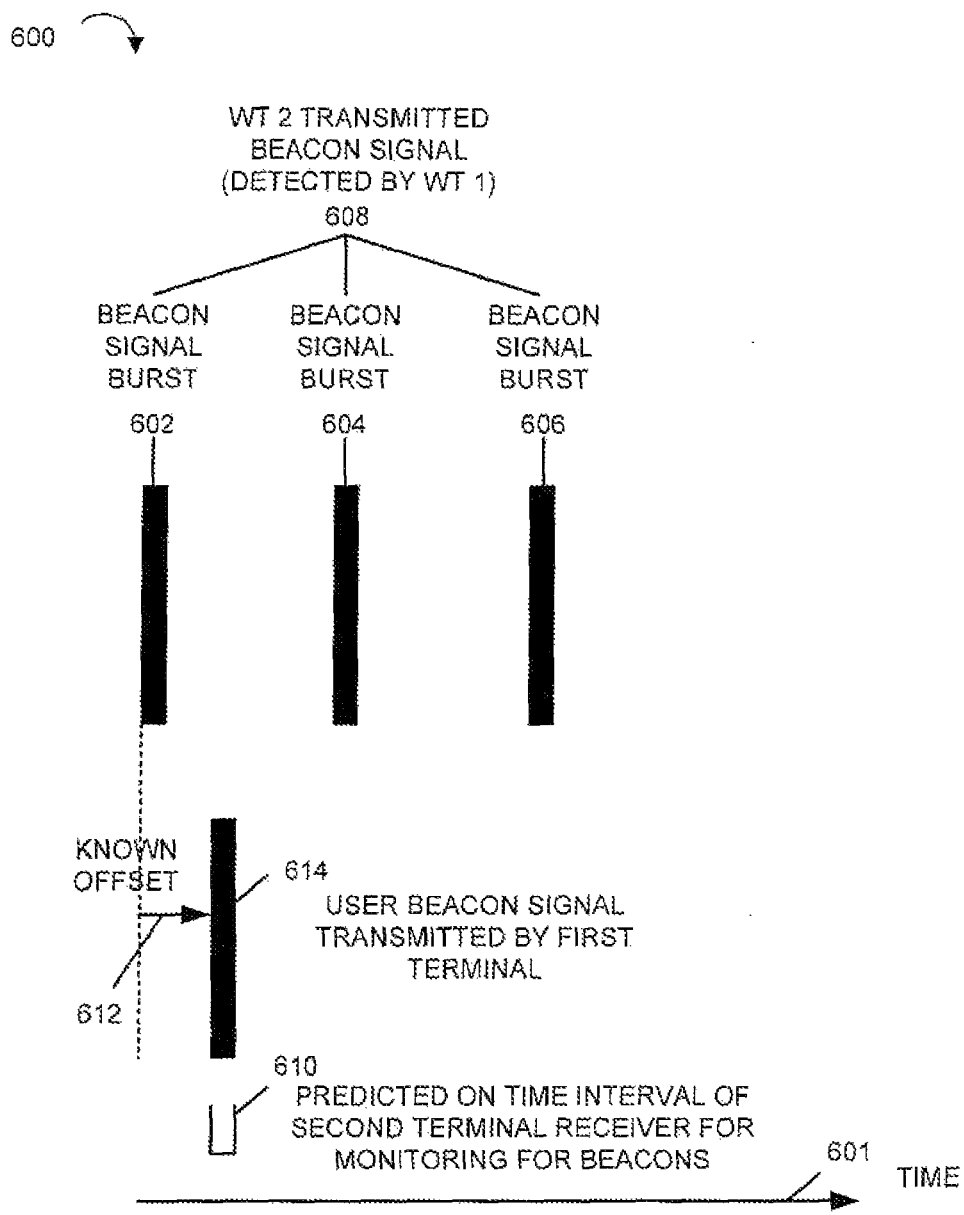
FIG. 6 illustrates one embodiment of monitoring for beacon signal bursts and transmitting a beacon burst in accordance with a predicted beacon monitoring interval.

Rather than sending its user beacon signal at a randomly chosen time instance, in the exemplary scenario show in FIG. 6, the first wireless terminal chooses to transmit (614) at the time during which the second wireless terminal is listening (610). The second wireless terminal detects the user beacon signal sent by the first wireless terminal, and then decides to stop using the spectrum band because its priority level is lower.

Note that in the absence of the above synchronization, it may take much longer time for the second wireless terminal to detect the user beacon signal sent by the first wireless terminal. Otherwise, the second wireless terminal may need to stay in the listening mode for a much longer time interval in order to reduce the latency of detection. The synchronization thus helps the wireless terminals to detect beacon signals much more rapidly and in a more power efficient manner.

Figure 7:
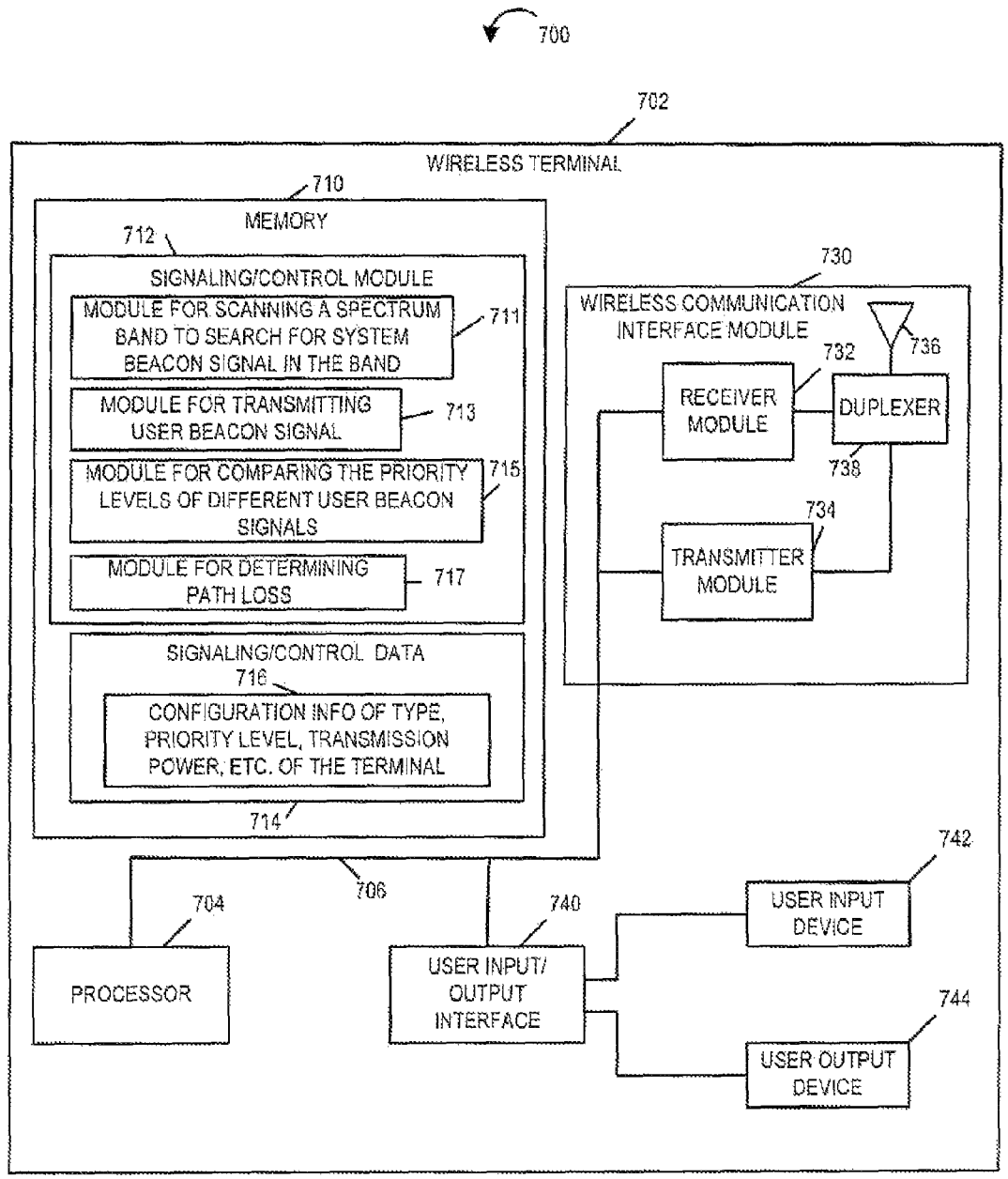
FIG. 7 illustrates a detailed illustration of an exemplary wireless terminal implemented in accordance with various embodiments.

FIG. 7 provides a detailed illustration of an exemplary wireless terminal 700 implemented in accordance with various embodiments. The exemplary wireless terminal 700, depicted in FIG. 7, is a detailed representation of an apparatus that may be used as any one of wireless terminals 102 and 104 depicted in FIG. 1. In the FIG. 7 embodiment, the wireless terminal 700 includes a processor 704, a wireless communication interface module 730, a user input/output interface 740 and memory 710 coupled together by bus 706. Accordingly, via bus 706 the various components of the terminal 700 can exchange information, signals and data. The components 704, 706, 710, 730, 740 of the wireless terminal 700 are located inside a housing 702.

The wireless communication interface 730 provides a mechanism by which the internal components of the wireless terminal 700 can send and receive signals to/from external devices and another terminal. The wireless communication interface 730 includes, e.g., a receiver module 732 and a transmitter module 734, which are coupled via a duplexer 738 with an antenna 736 used for coupling the wireless terminal 700 to other terminals, e.g., via wireless communications channels.

The exemplary wireless terminal 700 also includes a user input device 742, e.g., keypad, and a user output device 744, e.g., display, which are coupled to bus 706 via the user input/output interface 740. Thus, user input/output devices 742, 744 can exchange information, signals and data with other components of the wireless terminal 700 via user input/output interface 740 and bus 706. The user input/output interface 740 and associated devices 742, 744 provide a mechanism by which a user can operate the wireless terminal 700 to accomplish various tasks. In particular, the user input device 742 and user output device 744 provide the functionality that allows a user to control the wireless terminal 700 and applications, e.g., modules, programs, routines and/or functions, that execute in the memory 710 of the wireless terminal 700.

The processor 704 under control of various modules, e.g., routines, included in memory 710 controls operation of the terminal 700 to perform various signaling and processing as discussed below. The modules included in memory 710 are executed on startup or as called by other modules. Modules may exchange data, information, and signals when executed. Modules may also share data and information when executed. In the FIG. 7 exemplary embodiment, the memory 710 of wireless terminal 700 includes a signaling/control module 712 and signaling/control data 714.

The signaling/control module 712 controls processing relating to receiving and sending signals, e.g., beacon signals, user data signals, messages, etc., management of state information storage, retrieval, processing, scanning, transmission control, priority determination, path loss determination device identification, user identification, and spectrum availability determination. Signaling/control data 714 includes state information, e.g., parameters, status and/or other information relating to operation of the terminal. In particular, the signaling/control data 714 includes various configuration information 916, e.g., configuration information of type, priority level, transmission power, transmitter power capability, etc. of the terminal. The module 712 may, and sometimes does, access and/or modify the data 714, e.g., update the configuration information 716. The module 712 also includes module 711 for scanning a spectrum band to search for system beacon signal in the band; module 713 for transmitting user beacon signal; module 715 for comparing the priority levels of different user beacon signals; module 717 for determining path loss.

Figures 8, 8A:
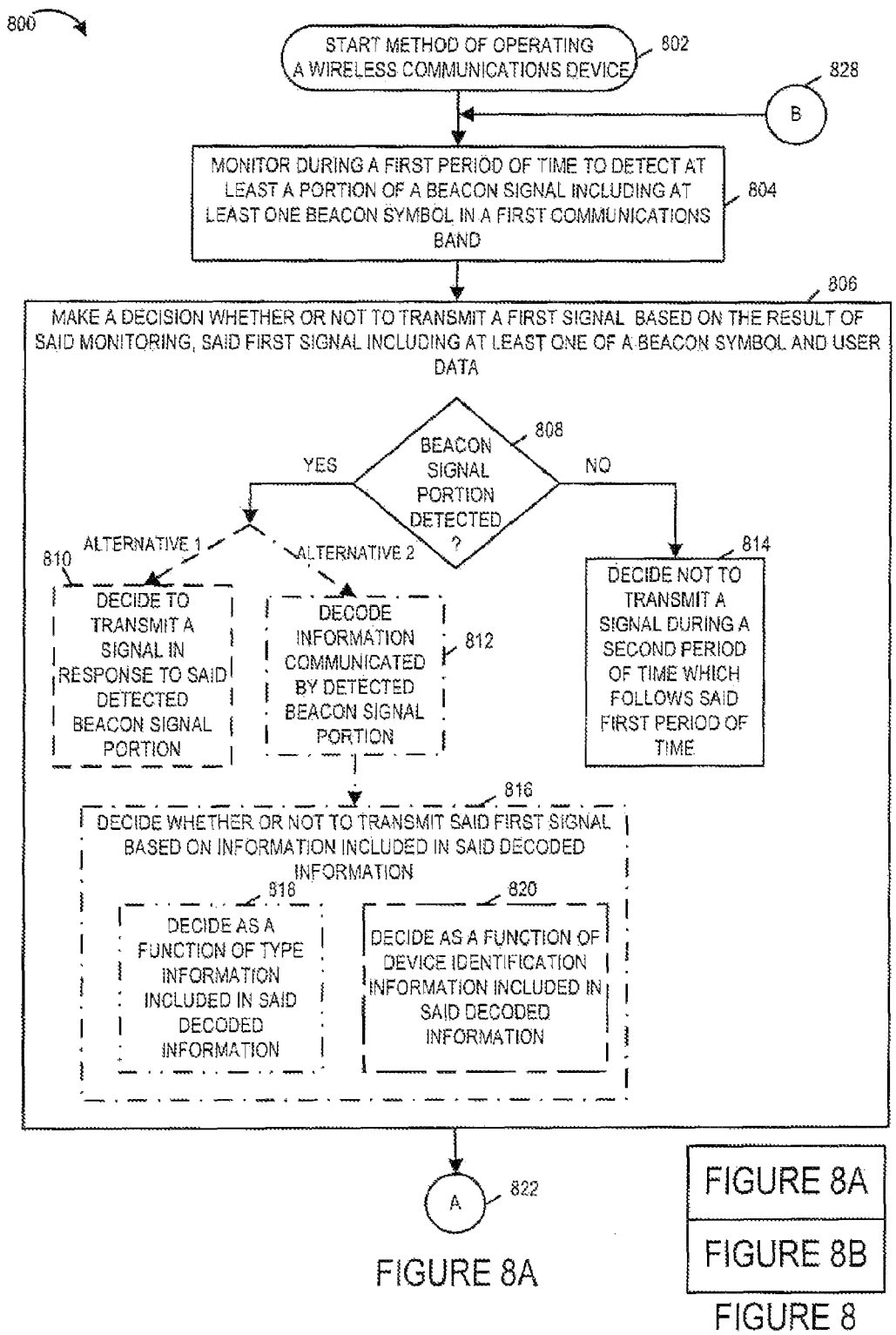
FIG. 8 comprising the combination of FIG. 8A
Figure 8B:
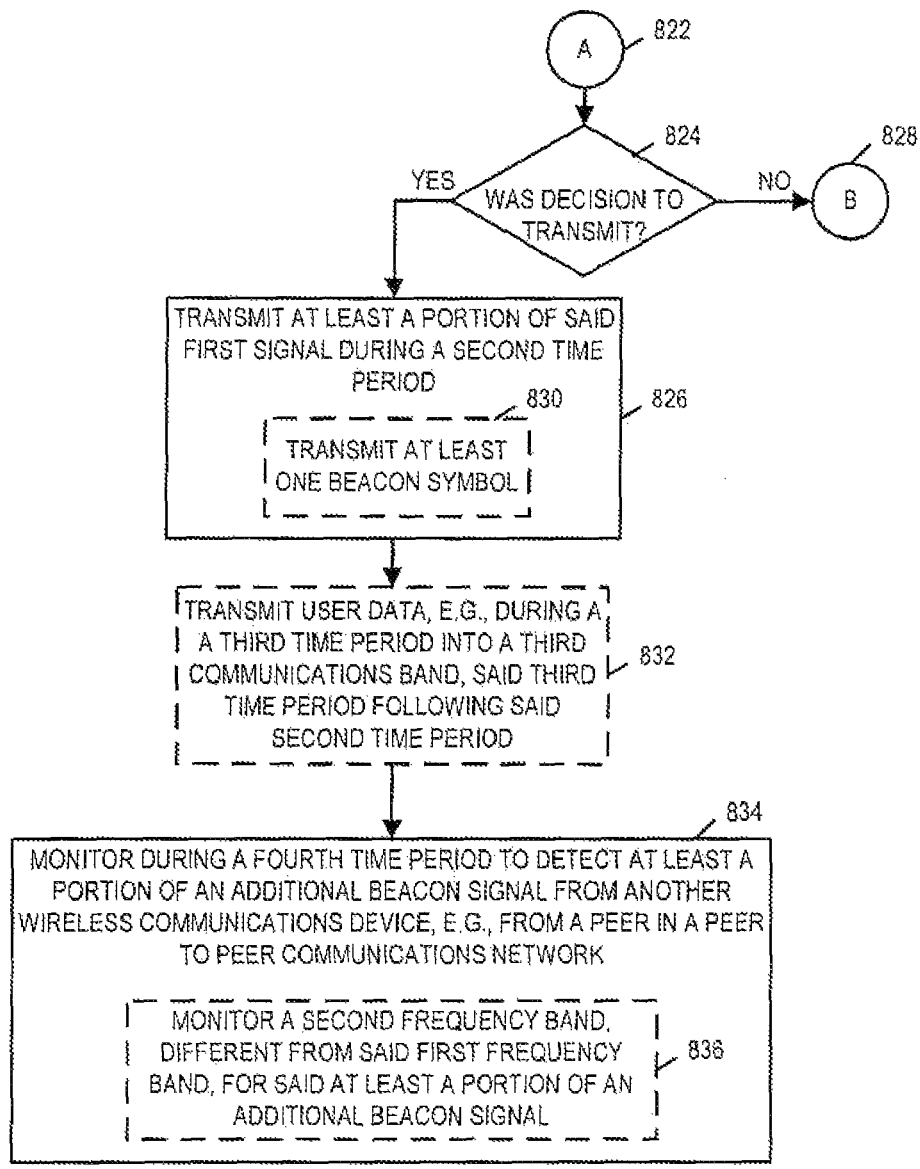
FIG. 8B is a drawing of a flowchart of an exemplary method of operating a wireless communications device, e.g., a wireless terminal such as a mobile node, in accordance with various embodiments.

FIG. 8 comprising the combination of FIG. 8A and FIG. 8B is a drawing of a flowchart 800 of an exemplary method of operating a wireless communications device e.g., a wireless terminal such as a mobile node, in accordance with various embodiments. The wireless communications device is, e.g., a portable wireless communications device, which may be operated off battery power. The wireless communications device is, e.g., wireless terminal 900 of FIG. 9.

Operation starts in step 802, where the wireless communications device is powered on and initialized and proceeds to step 804. In step 804, the wireless communications device monitors, during a first period of time, to detect at least a portion of a beacon signal including at least one beacon symbol in a first communications band.

Operation proceeds from step 804 to step 806. In step 806, the wireless communications device makes a decision as to whether or not to transmit a first signal based on the result of said monitoring, said first signal including at least one of a beacon symbol and user data. In some embodiments the first signal is a beacon signal. In some embodiments, said user data includes at least one of text data, audio data, image data, game data, and spread sheet data.

Step 806 includes sub-steps 808, 810, 812, 814, and 816. In sub-step 808, the wireless communications device determines if a beacon signal portion including at least one beacon symbol was detected in the monitoring of step 804. If a beacon symbol portion was detected operation proceeds from step 808 to one of alternative sub-steps 810 and 812. If a beacon symbol was not detected, operation proceeds from step 808 to step 814, where the wireless communications device decides not to transmit a signal during a second period of time which follows said first period of time.

In sub-step 810, the wireless communications device decides to transmit a signal in response to said detected beacon signal portion. In alternative, sub-step 812, the wireless communications device decodes information communicated by the detected beacon signal portion. Operation proceeds from sub-step 812 to sub-step 816. In sub-step 816, the wireless communications device decides whether or not to transmit said first signal based on information included in said decoded information. In various embodiments, sub-step 816 includes one or more of sub-steps 818 and 820. In sub-step 818, the wireless communications device decides as a function of type information included in said decoded information. In various embodiments, the type information indicates whether or not a second band is allowed to be used for peer to peer communications. In some embodiments, the type information identifies a second band which is allowed to be used for peer to peer communications. In sub-step 820, the wireless communications device decides as a function of device identification information included in said decoded information. In some such embodiments, the device identification information identifies at least one of the wireless communications device and a user that is currently using the wireless communications device.

Operation proceeds from step 806, via connecting node A 822, to step 824. In step 824, the wireless communications device proceeds differently depending upon whether or not the decision of step 806 was to transmit. If the decision was to transmit, then operation proceeds from step 824 to step 826. If the decision was not to transmit, then operation proceeds from step 824, via connecting node B 828, to step 804, where additional monitoring is performed.

In step 826, the wireless communications device transmits at least a portion of said first signal during a second time period. In some embodiments, the first signal is transmitted in a second band which is the same as the first communications band. For example, the received beacon signal portion and the first signal, e.g., transmitted beacon signal portion may correspond to peer nodes in a peer to peer communications network and both of the peer nodes may be using the same frequency band for user beacon signaling. In some other embodiments, the first signal is communicated in a second band which is different from the first communications band. For example, the received beacon signal portion may be communicated from a base station or fixed beacon signal transmitter using a different communications band than the band into which the communications device transmits its user beacon-signaling. In some such embodiments, the first and second communications bands are separated and disjoint in the frequency domain. In various embodiments, the first and second communications bands are different size frequency bands.

In some embodiments, step 826 includes sub-step 830, in which the wireless communications device transmits at least one beacon symbol. For example, the at least one beacon symbol is a single beacon symbol or a small number of beacon symbols in a beacon burst, e.g., with the beacon symbols occupying <10% of the beacon symbol transmission units of the beacon burst.

Operation proceeds from step 826 to one of steps 832 and 834. In step 832, the wireless communications device transmits user data, e.g., during a third time period, into a third communications band, said third time period following said second time period. For example, during the second time period the wireless communications device transmits at least a portion of the first signal including at least one beacon symbol, e.g., to identify its presence, and during the third time period, the wireless communications device transmits user data to a peer. In various embodiments, the third frequency band is the same as the second frequency band. For example, the wireless communications device may transmit both a user beacon signal and user data for peer to peer communications into the same frequency band. In some other embodiments, the second frequency band is different from the third frequency band. For example, there may be distinct frequency bands for user beacon signals and for user data signals.

Operation proceeds from step 832 to step 834. In step 834, the wireless communications device monitors during a fourth time period to detect at least a portion of an additional beacon signal from another wireless communications device, e.g., from a peer in a peer to peer communications network. Step 834 includes, in some embodiments, sub-step 836. In sub-step 836, the wireless communications device monitors a second frequency band, different from said first frequency band, for at least a portion of an additional beacon signal.

Figure 9:
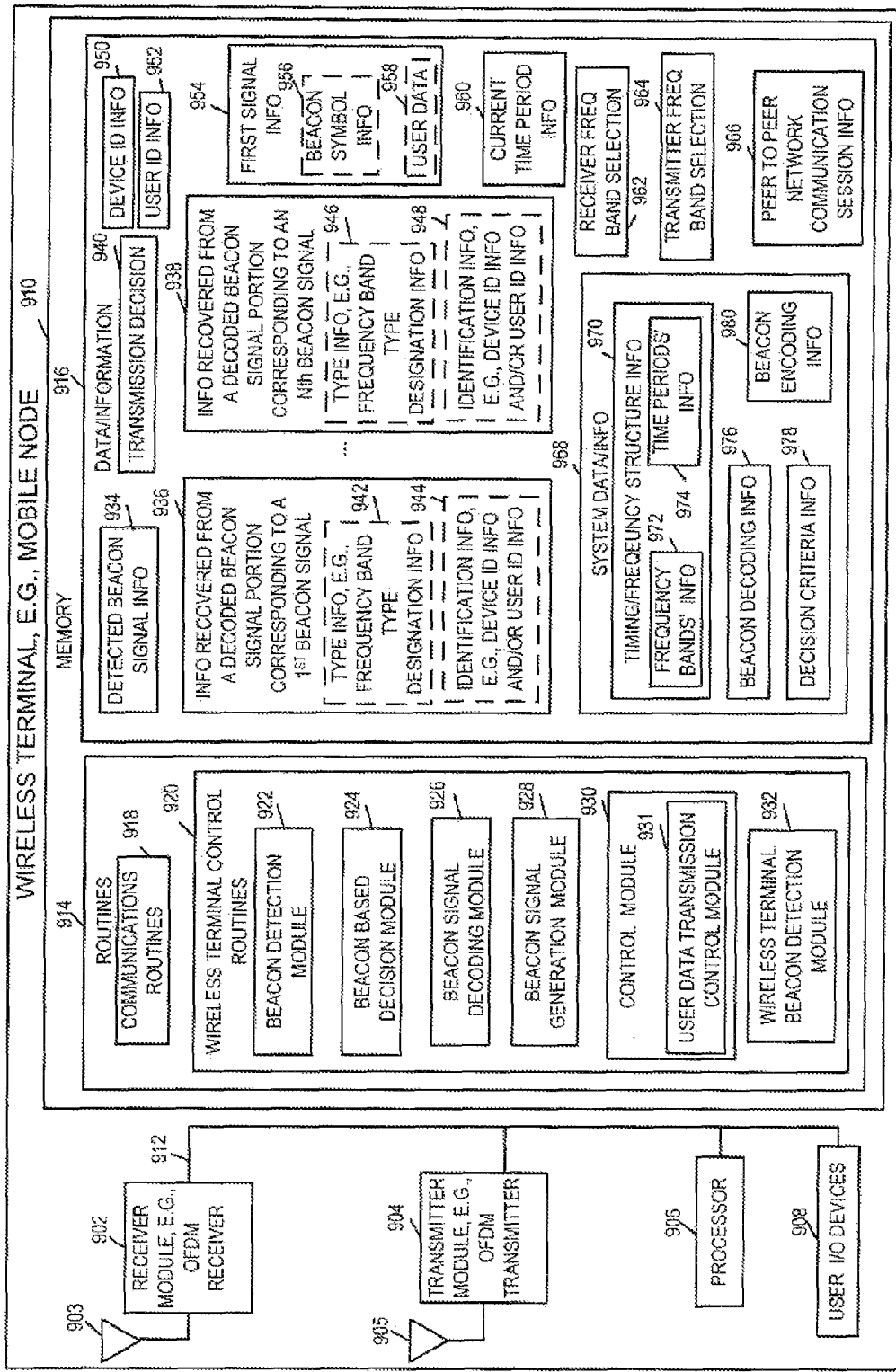
FIG. 9 is a drawing of an exemplary wireless terminal, e.g., mobile node, implemented in accordance with various embodiments.

FIG. 9 is a drawing of an exemplary wireless terminal 900, e.g., mobile node, implemented in accordance with various embodiments. Exemplary wireless terminal 900 may be any of the exemplary wireless terminals (102, 104) of system 100 of FIG. 1.

Exemplary wireless terminal 900 includes a receiver module 902, a transmitter module 904, a processor 906, user I/O devices 908, and memory 910 coupled together via a bus 912 over which the various elements may interchange data and information. Memory 910 includes routines 914 and data/information 916. The processor 906, e.g., a CPU, executes the routines 914 and uses the data/information 916 in memory 910 to control the operation of the wireless terminal 900 and implement methods.

Receiver module 902, e.g., an OFDM receiver, is coupled to receive antenna 903 via which the wireless terminal receives signals from other wireless communications devices, e.g., other wireless terminals and/or system terminals such as base stations and/or fixed location beacon transmitters. Received signals include, e.g., beacon signals from wireless terminals, beacon signals from system nodes, and handshaking signals and user data signals from wireless terminals, e.g., in peer-to-peer communications.

Transmitter module 904, e.g., an OFDM transmitter, is coupled to transmit antenna 905, via which the wireless terminal 900 transmits signals to other wireless communications devices, e.g., peer nodes. In some embodiments, the same antenna is used for receiver module 902 and transmitter module 904, e.g., with the receiver and transmitter modules (902, 904) being coupled to the antenna via a duplexer module. Signals transmitted by the transmitter module 904 include, e.g., a first signal such as a beacon signal or beacon signal portion including at least one beacon symbol. Other signals transmitted by transmitter module 904 include peer-to-peer communication session establishment signals and user data signals.

User I/O devices 908 include, e.g., microphone, keypad, keyboard, switches, camera, speaker, display, etc. User I/O devices 908 allow a user of wireless terminal 900 to input data/information, access output data/information, and control at least some functions of the wireless terminal 900.

Routines 914 include communications routines 918 and wireless terminal control routines 920. The communications routines 918 implement various communications protocols used by the wireless terminal. Wireless terminal control routines 920 include a beacon detection module 922, a beacon based decision module 924, a beacon signaling decoding module 926, a beacon signal generation module 928, a control module 930 and a wireless terminal beacon detection module 932.

Beacon detection module 922 detects receipt of one or more beacon symbols communicated in a first communications band. Beacon based decision module 924 determines whether or not to transmit a first signal based on an output of the beacon detection module 922, said output being a function of whether or not a beacon symbol was detected during a time period, said first signal including at least one of a beacon symbol and user data. Beacon signaling decoding module 926 decodes information communicated by a detected beacon signal portion at least one detected beacon symbol being part of said detected beacon signal portion. In some embodiments, the beacon based decision module 924 makes the decision whether or not to transmit a first signal based on decoded information generated by the decoding performed by the beacon signal decoding module. In some embodiments, the beacon based decision module 924 makes a decision not to transmit a signal during a second time period which follows a first time period when at least a portion of a beacon signal including a beacon symbol is not detected by said beacon detection module during the first period of time. In some embodiments, the beacon based decision module 924 makes the decision whether or not to transmit a signal based on type information included in the decoded information, said type information indicating that a second band is allowed to be used for peer-to-peer communications. In some embodiments, the beacon based decision module 924 makes the decision whether or not to transmit a signal based on device information included in the decoded information.

Beacon signal generation module 928 generates beacon signals, said generated beacon signals communicating an identifier used to identify at least one of: i) said wireless communications device and ii) a user that is currently using said wireless communications device. Control module 930 controls the band in which the receiver and transmitter operate. Control module 930 includes a user data transmission control module 931. In some embodiments said receiver and transmitter are controlled to use the same band in a time division multiplexed basis. In some embodiments, the receiver is controlled to use a first communications band and the transmitter is controlled to use a second communications band, said first and second communications bands being different bands. In some embodiments, the first and second communications bands are separated and disjoint in the frequency domain but have a predetermined relationship. In some such embodiments, the first and second communications bands are different size frequency bands.

User data transmission control module 931 controls the transmission of user data into a third communications band during a third period. In some embodiments, the third time period follows a second time period, said second time period being a time period during which at least a portion of said first signal is transmitted, said first signal including at least one beacon symbol. In some embodiments, the third communications band is the same as the second communications band. In some embodiments, the third communications band is different from the second communications band.

Wireless terminal beacon detection module 932 detects beacon symbols from other wireless communications devices during a fourth period of time, at least a portion of said fourth period of time being different from a time period during which said beacon detection module 922 is operated. The other wireless communications devices are, e.g., peer nodes in a peer to peer communications network. In some embodiments, the wireless terminal beacon detection module 932 monitors a second communications band, said second communications band being a different frequency band than said first communications band.

Data/information 916 includes detected beacon signal information 934, information recovered from decoded beacon signal portions (information recovered from a decoded beacon signal portion corresponding to a $1^{st}$ beacon signal 936, ..., information recovered from a decoded beacon signal portion corresponding to an Nth beacon signal 938), transmission decision information 940, device identification information 950, user identification information 952, first signal information 954, current time period information 960, receiver frequency band selection information 962, transmitter frequency band selection information 964, peer to peer network communication session information 966 and system data/information 968.

Information recovered from a decoded beacon signal portion corresponding to a $1^{st}$ beacon signal 936 includes, in some embodiments, one of more of type information 942 and identification information 944. The type information 942 is, e.g., frequency band type designation information. The type information 942 may, and sometimes does indicate that the band type is designated to be used for peer-peer communications. The identification information 944 is, e.g., device identification information and/or user identification information.

Information recovered from a decoded beacon signal portion corresponding to a $N^{th}$ beacon signal 938 includes, in some embodiments, one of more of type information 946 and identification information 948. The type information 946 is, e.g., frequency band type designation information. The identification information 948 is e.g., device identification information and/or user identification information.

First signal information 956 includes, in some embodiments, one or more of beacon symbol information 956 and user data 358. Beacon symbol information 956 includes, e.g., information identifying the beacon transmission units used to convey beacon symbols, e.g., within beacon bursts of the beacon signal included in the first signal, tone hopping pattern information, and/or time information corresponding to the beacon symbols. User data 958 includes data information such as voice data, other types of audio data, image data, text data, file data, etc. of the first signal, e.g., corresponding to data symbols of the first signal.

System data/information 968 includes timing/frequency structure information 970, beacon decoding information 976, decision criteria information 978 and beacon encoding information 980. Timing/frequency structure information 970 includes frequency bands' information 972 and time periods' information 974. Frequency bands' information 972 includes information identifying a plurality of different frequency bands, which are at times used by the wireless terminal.

Frequency bands' information 372 also includes information relating beacon signals to frequency bands. In some embodiments, different bands are used for different purposes. For example, one frequency band, in some embodiments, is used for beacon signaling and another frequency band is used for user data signaling. In some embodiments, at least some frequency bands are used for multiple purposes, e.g., user data beacon signaling and wireless terminal beacon signaling. In some embodiments, the same band is used, at different times for different purposes, e.g., a frequency band typically used for wireless communications via a base station, in some embodiments, is at times, used for peer-to-peer communications. Time periods' information 974 includes, e.g., information identifying in a timing structure when the wireless terminal should receive beacon signals, transmit beacon signals and communicate user data signals to a peer node.

Beacon decoding information 976, e.g., information mapping various potential detected beacon signals to recovered information, e.g., frequency band type designation information, device ID information, user ID information, and/or priority level information, is used by beacon signal decoding module 926 to recover information (936, . . . 938), e.g., when processing beacon symbol information 934.

Figure 10:
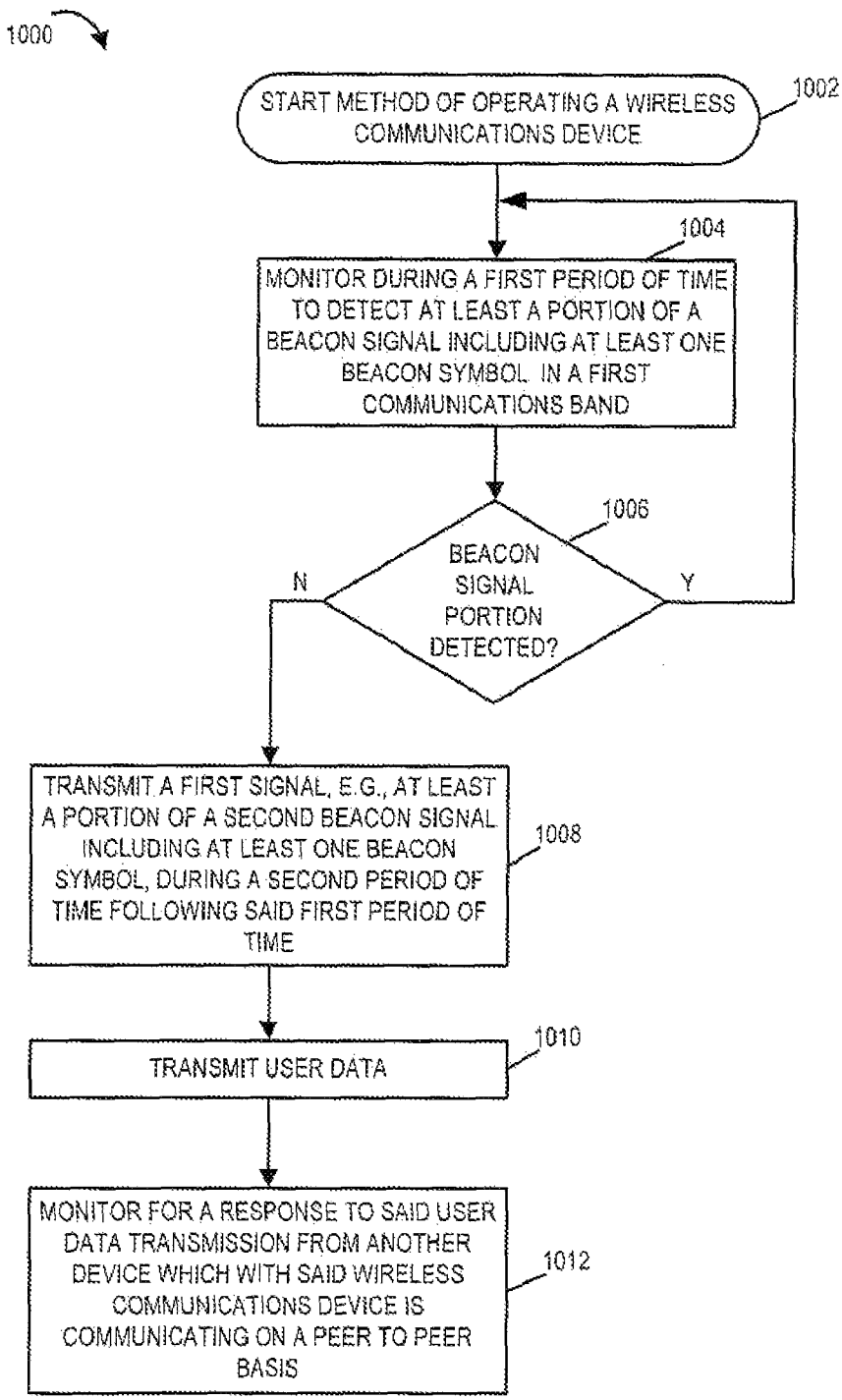
FIG. 10 is a drawing of a flowchart of an exemplary method of operating a wireless communications device in accordance with various embodiments.

FIG. 10 is a drawing of a flowchart 1000 of an exemplary method of operating a wireless communications device in accordance with various embodiments. The wireless communications device is, e.g., a portable wireless terminal such as a mobile node which may be operated using battery power. The wireless communications device is, wireless terminal 1100 of FIG. 11. Operation starts in step 1002, where the wireless communications device is powered on and initialized. Operation proceeds from start step 1002 to step 1004. In step 1004, the wireless communications device monitors during a first period of time to detect at least a portion of a beacon signal including at least one beacon symbol in a first communications band. In some embodiments, a beacon signal portion communicates an identification value. For examples, the identification value can be one of a device identifier and a user identifier.

Then, in step 1006 operation proceeds differently depending upon whether or not at least a portion of a beacon signal including at least one beacon symbol was detected in step 1004. If a beacon signal portion was detected, operation proceeds from step 1006 to step 1004 to monitor during another first period of time. However, if a beacon signal portion was not detected, then operation proceeds from step 1006 to step 1008.

In step 1008, the communications device transmits a first signal, e.g., at least a portion of second beacon signal including at least one beacon symbol, during a second period of time following said first period of time. In some embodiments, the first signal is transmitted into the first communications band. In some embodiments said second period of time has a fixed time relationship with said first period of time. In various embodiments, the second period of time has a predetermined time offset from the start of the first period of time.

Then, in step 1010, the wireless communications device transmits user data. The first signal is, in some embodiments, transmitted prior to the user data transmission during non-overlapping time periods. In various embodiments, the user data is also transmitted in the first communications band. Operation proceeds from step 1010 to step 1012. In step 1012, the wireless communications device monitors for a response to said user data transmission from another device which with said wireless communications device is communicating on a peer to peer basis.

Figure 11:
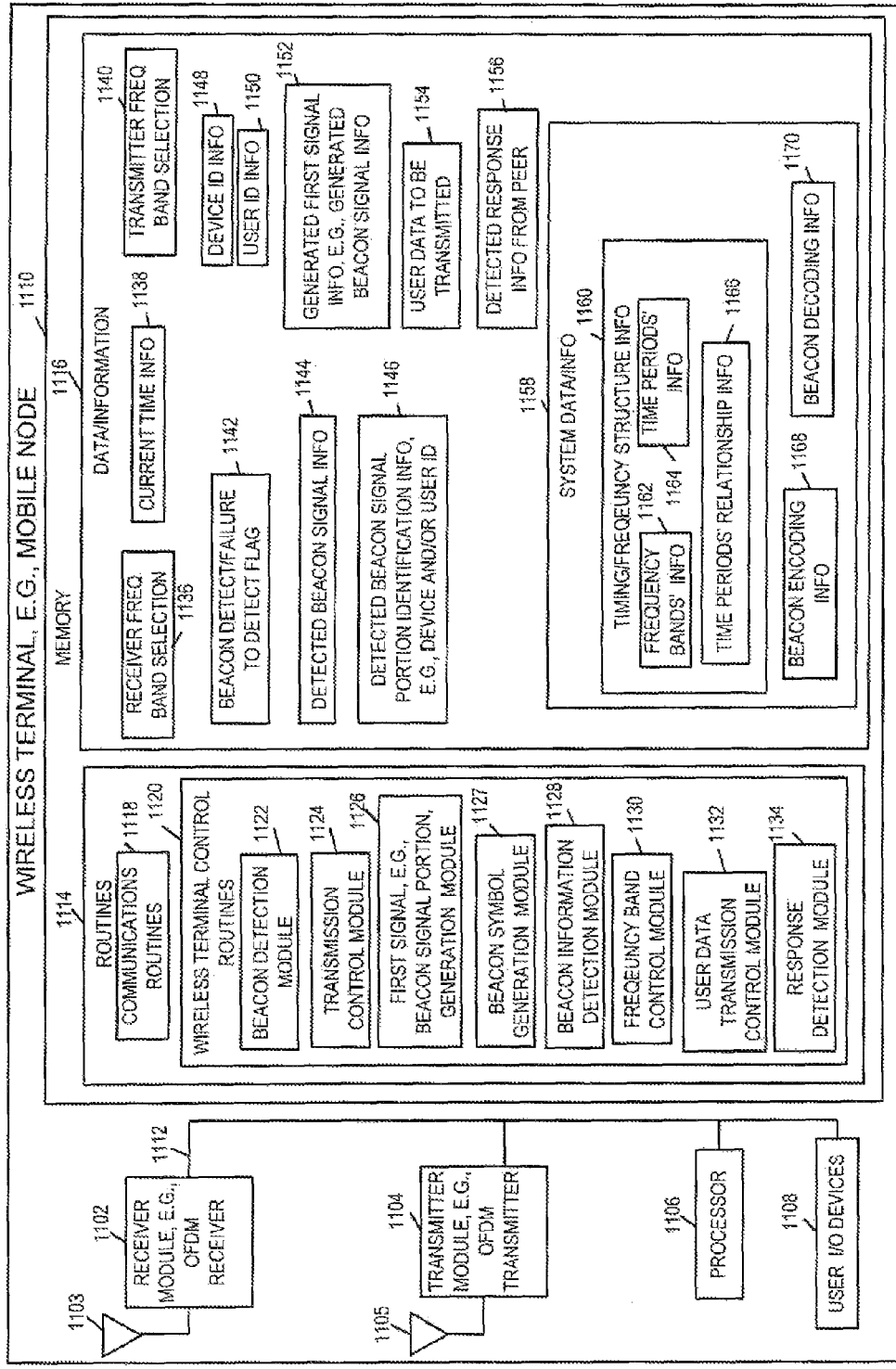
FIG. 11 is a drawing of an exemplary wireless terminal, e.g., mobile node, implemented in accordance with various embodiments.

FIG. 11 is a drawing of an exemplary wireless terminal 1100, e.g., mobile node, implemented in accordance with various embodiments. Exemplary wireless terminal 1100 may be any of the exemplary wireless terminals (102, 104) of system 100 of FIG. 1.

Exemplary wireless terminal 1100 includes a receiver module 1102, a transmitter module 1104, a processor 1106, user I/O devices 1108, and memory 1110 coupled together via a bus 1112 over which the various elements may interchange data and information. Memory 1110 includes routines 1114, and data/information 1116. The processor 1106, e.g., a CPU executes the routines 1114 and uses the data/information 1116 in memory 1110 to control the operation of the wireless terminal 1100 and implements methods.

Receiver module 1102, e.g., an OFDM receiver, is coupled to receive antenna 1103 via which the wireless terminal 1100 receives signals from other wireless communications devices. Receiver module 1102 receives beacon signal portions, e.g., transmitted in a first communications band. Receiver module 1102 also receives session establishment signals and user data signals from peers, as part of peer-peer communications sessions.

Transmitter module 1104, e.g., an OFDM transmitter, is coupled to transmit antenna 1105, via which the wireless terminal 1100 transmits signals to other wireless communications devices, e.g., peer nodes. In some embodiments, the same antenna is used for receiver module 1102 and transmitter module 1104, e.g., in conjunction with duplex module. Transmitted signals include beacon signals, communications session establishment signals and user data signals as part of a peer-peer communications session.

User I/O devices 1108 include, e.g., microphone, keypad, keyboard, switches, camera, speaker, display, etc. User I/O devices 1108 allow a user of wireless terminal 1100 to input data/information, access output data/information, and control at least some functions of the wireless terminal 1100, e.g., attempt to establish a peer-peer communications session.

Routines 1114 include communications routines 1118 and wireless terminal control routines 1120. The communications routines 1118 implement various communications protocols used by the wireless terminal 1100. Wireless terminal control routines 1120 include a beacon detection module 1122, a transmission control module 1124, a first signal, e.g., beacon signal portion, generation module 1126, a beacon symbol generation module 1127, a beacon information detection module 1128, a frequency band control module 1130, a user data transmission control module 1132, and a response detection module 1134.

Beacon detection module 1122 detects the receipt of beacon symbols communicated in a first communications band. Transmission control module 1124 controls signal transmission as a function of an output of the beacon detection module 1122. The transmission control module 1124 controls the transmitter module 1104 to transmit a first signal during a second period of time following a first period of time when a beacon signal portion including at least one beacon symbol is not detected during said first period of time. In some embodiments, the second period of time has a fixed time relationship with the first period of time, e.g., a predetermined time offset with respect to the start of the first period of times.

First signal generation module 1126 generates first signals. For example, an exemplary first signal is a beacon signal portion such as a beacon signal burst including at least one beacon symbol. Beacon symbol generation module 1127 generates beacon symbols, e.g., beacon symbols which are included in generated beacon symbol portions. For example, a beacon symbol is a relatively high power symbol with respect to a data symbol from the transmission perspective of the wireless terminal, facilitating easy detection. For example, the average transmission power difference between a beacon symbol and a data symbol are, in some embodiments, at least 10 dBs. In some embodiments, each of the generated beacon symbols has the same transmission power level. In some embodiments, each generated beacon symbol has the same phase, while generated data symbols may, and generally do have different phase, e.g., as part of a QPSK, QAM16, QAM256, etc. constellation.

Beacon information detection module 1128 determines an identification value communicated by a detected portion of a beacon signal. The identification value is, e.g., one of a device identifier and a user identifier.

Frequency band control module 1130 controls the band in which the receiver module 1102 and transmitter module 1104 operate. In some embodiments, the receiver module 1102 and transmitter module 1104 are controlled to use the same band in a time division multiplexed basis, e.g., with respect to a peer-peer communications session.

User data transmission control module 1132 controls transmission of user data in addition to said first signal in said first communications band. In some embodiments, the first signal is transmitted prior to said user data and the user data transmission control module 1132 control transmission of said user data to occur in a transmission time period which does not overlap with transmission of said first signal. In various embodiments, the user data transmission control module 1132 controls the transmission of user data so that user data is transmitted into the first band, e.g., the same band into which the wireless terminal is transmitting its beacon signal.

Response detection module 1134 detects a response to the user data transmission from another device with which said wireless terminal device is communicating on a peer to peer basis. The response is, e.g., user data from the peer node and/or control information. Control information is, e.g., handshaking information, session establishment information, session termination information, session maintenance information, power control information, timing control information, frequency band information, etc.

Data/information 1116 includes receiver frequency band selection information 1136, current time information 1138, transmitter frequency band selection information 1140, beacon detect/failure to detect flag 1142, detected beacon signal information 1144, detected beacon signal portion identification information 1146, device identification information 1148, user identification information 1150, generated first signal information, e.g., generated beacon signal, information 1152, user data to be transmitted 1154, detected response information from a peer 1156, and system data/information 1158.

Receiver frequency band selection 1136 and transmitter frequency band selections 1140 are outputs of the frequency band selection module 1130 and used by the wireless terminal in controlling the receiver module 1102 and transmitter module 1104 tuning. Beacon detect/failure to detect flag 1142, e.g., a single bit output, from beacon detection module 1122, is used by the transmission control module 1124 in making beacon transmission decisions in accordance with the system beacon signaling rules.

Detected beacon signal information 1144 includes information recovered by beacon signal detection module 1122 corresponding to a detected beacon signal, e.g., a set of identified beacon transmission units conveying beacon symbols, a pattern of beacon symbols, a slope associated with detected beacon symbols, etc. Detected beacon signal portion identification information 1146 is an output of beacon information detection module 1128 and is, e.g., a device identifier or user identifier, which identifies the source of the detected beacon signal.

Generated first signal information, e.g., generated beacon signal information 1152 corresponds to the first signal generated by first signal generation module 1126 and includes, e.g., information defining a beacon signal burst including, e.g., beacon symbol tone identification information, null tone identification information, beacon burst duration information, and beacon burst timing information.

User data to be transmitted 1154 includes, e.g., voice, other audio data, image data, text, and/or file data intended for a peer to be communicated under the control of user data transmission control module 1132, e.g., at the appropriate time, e.g., during a user data interval, in an implemented timing structure. Detected response information from peer 1156 is an output of response detection module 1134.

System data/information 1158 includes timing/frequency structure information 1160, beacon encoding information 1168, and beacon decoding information 1170. Timing/frequency structure information 1160 includes frequency bands' information 1162, time periods' information 1164 and time periods' relationship information 1166.

Figure 12:
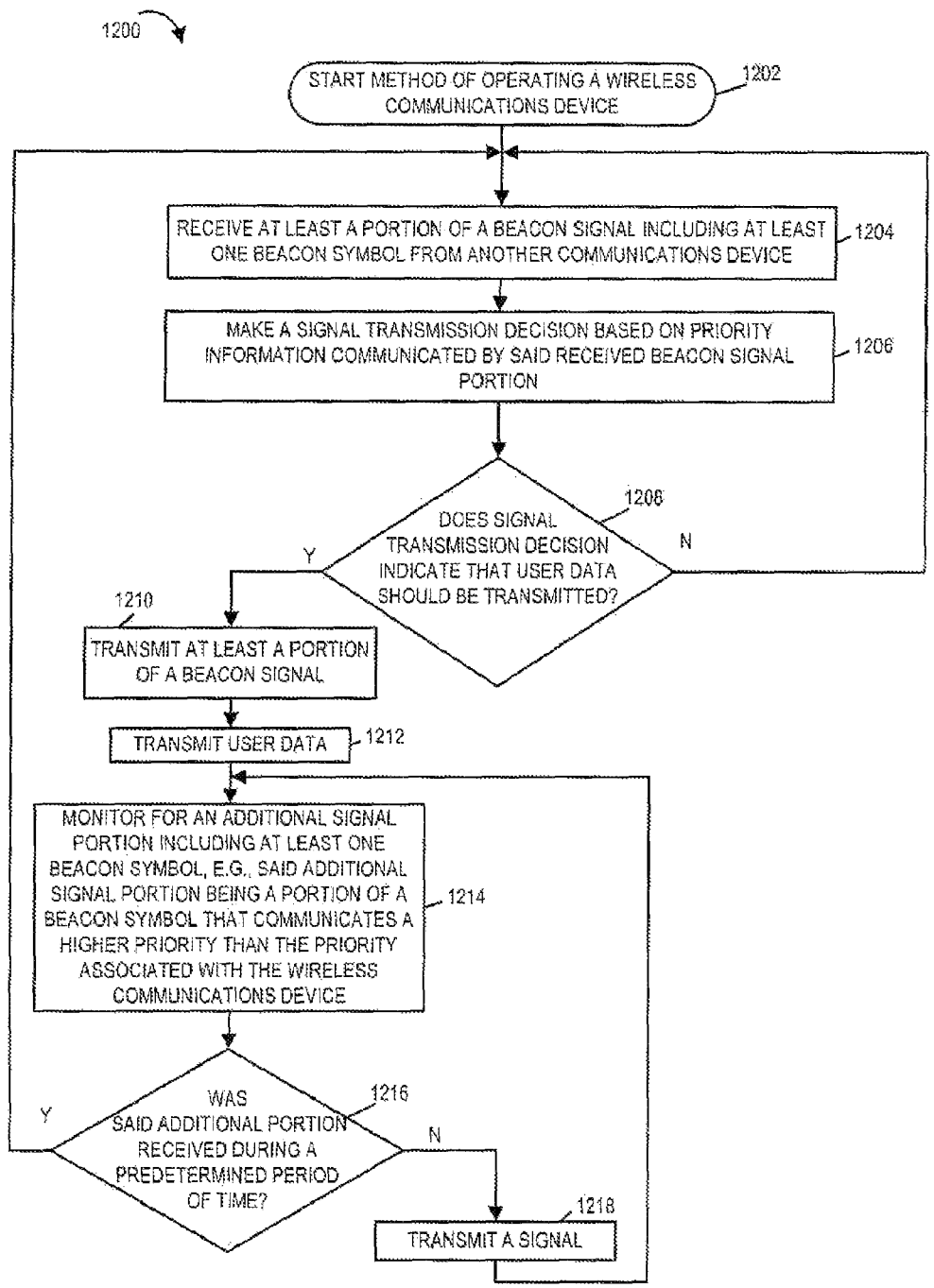
FIG. 12 is a drawing of a flowchart of an exemplary method of operating a wireless communications device in accordance with various embodiments.

FIG. 12 is a drawing of a flowchart 1200 of an exemplary method of operating a wireless communications device in accordance with various embodiments. The wireless communications device is, e.g., a portable wireless terminal such as a mobile node which may be operated using battery power. The wireless communications device is, e.g., wireless terminal 1300 of FIG. 13. Operation starts in step 1202, where the wireless communications device is powered on and initialized and proceeds to step 1204. In step 1204, the wireless communications device receives at least a portion of a beacon signal including at least one beacon symbol from another communications device. Operation proceeds from step 1204 to step 1206. In step 1206, the wireless communications device makes a signal transmission decision based on priority information communicated by said received beacon signal portion. The priority information indicates, e.g., one of a device priority, user priority and session priority.

Priority information may be, and sometimes is, coded using a plurality of beacon symbols included in said beacon signal portion. In some such embodiments, priority information is coded at least partially by positions of beacon symbols in a set of beacon symbol transmission units used to communicate said beacon signal portion. In some embodiments, priority information is coded at last partially based on changes in beacon symbol positions in a set of beacon symbol transmission units used to transmit said beacon signal portion over a time period including multiple beacon symbol transmission time periods. In some such embodiments, the beacon symbol transmission units in a set of beacon symbol transmission units correspond to a predetermined tone hopping pattern corresponding to the priority level to be communicated. In various embodiments, a unique beacon symbol pattern is used to communicate a top priority beacon indicating a higher priority than all other beacons used to communicate priority information.

In some embodiments, making a transmission decision includes deciding not to transmit user data when said priority information indicates a higher priority than a priority associated with said wireless communications device. In some embodiments, making a transmission decision includes deciding to transmit user data when said priority information indicates a lower priority than a priority associated with said wireless communications device.

Making a transmission decision may, and sometimes does, include deciding to transmit user data at a transmission power level which is determined as a function of the received priority level and a received power level of the received beacon signal portion. In some embodiments, the transmission power level of the wireless communications device is reduced when the received beacon signal portion indicates a higher priority level than a priority level indicated by a previously received beacon signal portion that was used to control transmission power. In some embodiments, the transmission power level of the wireless communications device is reduced when the received beacon signal portion indicates a lower priority level than a priority level indicated by a previously received beacon signal portion that was used to control transmission power.

Next, in step 1208, operation proceeds differently depending upon the signal transmission decision of step 1206. If the signal transmission decision indicates that user data should be transmitted, then operation proceeds from step 1208 to step 1210. If the signal transmission decision indicates that user data should not be transmitted, then operation proceeds from step 1208 to step 1204, where the wireless communications device is operated to receive another at least a portion of a beacon signal including at least one beacon symbol.

In step 1210, the wireless communications device is operated to transmit at least a portion of beacon symbol e.g., a beacon signal burst or a plurality of beacon signal bursts. In various embodiments, the transmitted portion of a beacon signal identifies at least one of said wireless communications device and a user that is using said wireless communications device to transmit user data. In some embodiments, the transmitted beacon signal portion communicates priority information corresponding to said wireless communications device. Operation proceeds from step 1210 to step 1212. In step 1212, the wireless communications transmits user data. Operation proceeds from step 1212 to step 1214.

In step 1214, the wireless communications device monitors for an additional signal portion including at least one beacon symbol, e.g., said additional signal portion being a portion of a beacon symbol that communicates a higher priority than the priority associated with the wireless communications device. Operation proceeds from step 1214 to step 1216. In step 1216, the wireless communications device determines if said additional portion was received during a predetermined period of time.

IF it is determined that said additional portion was not received then operation proceeds from step 1216 to step 1218, where the wireless communications device transmits a signal. Operation proceeds from step 1218 to step 1214 for additional monitoring for another predetermined period of time.

Returning to step 1216, if it is determined that said additional portion was not received then operation proceeds from step 1216 to step 1204, where the wireless communications device is operated to receive another at least a portion of a beacon symbol including at least one beacon symbol.

Figure 13:
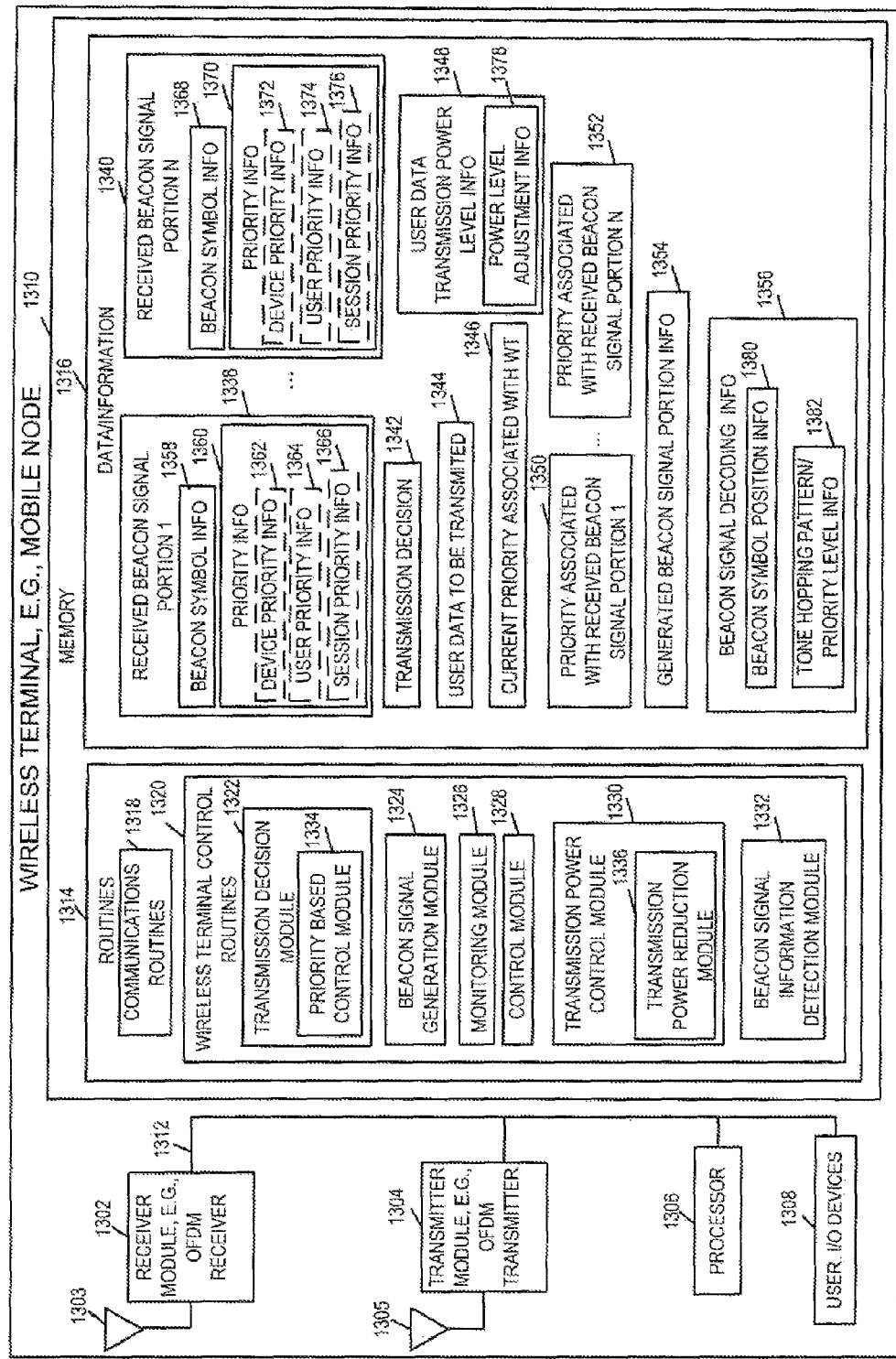
FIG. 13 is a drawing of an exemplary wireless terminal, e.g., mobile node, implemented in accordance with various embodiments.

FIG. 13 is a drawing of an exemplary wireless terminal 1300, e.g., mobile node, implemented in accordance with various embodiments. Exemplary wireless terminal 1300 may be any of the exemplary wireless terminals (102, 104) of system 100 of FIG. 1.

Exemplary wireless terminal 1300 includes a receiver module 1302, a transmitter module 1304, a processor 1306, user I/O devices 1308, and memory 1310 coupled together via a bus 1312 over which the various elements may interchange data and information. Memory 1310 includes routines 1314 and data/information 1316. The processor 1306, e.g., a CPU, executes the routines 1314 and uses the data/information 1316 in memory 1310 to control the operation of the wireless terminal 1300 and implement methods.

Receiver module 1302, e.g., an OFDM receiver, is coupled to receive antenna 1303 via which the wireless terminal receives signals from other wireless communications devices. Receiver module 1302 receives signals from other communication devices including at least a portion of a beacon signal including at least one beacon symbol. Received signals include beacon signals and user data signals from peer nodes.

Transmitter module 1304, e.g., an OFDM transmitter, is coupled to transmit antenna 1305, via which the wireless terminal transmits signals to other wireless communications devices, e.g., peer nodes. In some embodiments, the same antenna is used for receiver module 1302 and transmitter module 1304, e.g., in conjunction with a duplex module. Transmitter module 1304 transmits signals including beacon signal portions and user data in accordance with decisions of the signal transmission decision module 1322. In various embodiments, the transmitted portion of a beacon signal including at least one beacon symbol identifies at least one of: i) wireless communications device 1300 and ii) a user that is using wireless terminal 1300 to transmit user data.

User I/O devices 1308 include, e.g., microphone, keypad, keyboard, switches, camera, speaker, display, etc. User I/O devices 1308 allow a user of wireless terminal 1300 to input data/information access output data/information, and control at least some functions of the wireless terminal 1300, e.g., attempt to establish a peer-to-peer communication session.

Routines 1314 include communications routines 1318 and wireless terminal control routines 1320. The communications routines 1318 implement various communications protocols used by the wireless terminal 1300. Wireless terminal control routines 1320 include a transmission decision module 1322, a beacon signal generation module 1324, a monitoring module 1326, a control module 1328, a transmission power control module 1330, and a beacon signal information detection module 1332.

Transmission decision module 1222 makes a signal transmission decision based on priority information communicated by the received beacon signal portion. The priority information indicates, e.g., one of a device priority, a user priority and a session priority. Transmission decision module 1322 includes a priority based control module 1334. Priority based control module 1334 prevents transmission of user data when the received priority information indicates a higher priority than a priority associated with said wireless terminal 1300. In various embodiments, the priority based control module 1334 enables user data transmissions when the received priority information indicates a lower priority than a priority associated with the wireless terminal 1300.

Beacon signal generation module 1324 generates beacon signal portions, a generated beacon signal portion including at least one beacon symbol. Some beacon signal portions are referred to a beacon burst signals.

Control module 1328 controls monitoring module 1326 to monitor for an additional beacon signal portion including at least one beacon symbol following the transmission decision module 1322 making a signal transmission decision. In some embodiments, if an additional beacon signal portion communicating a higher priority than said priority associated with wireless terminal 1300 is not received in a predetermined period of time, the transmission decision module 1322 makes a decision to transmit a signal.

Transmission power control module 1330 controls a user data transmission power level as a function of at least one of the received priority level and a received power level of the received beacon signal portion. Transmission power control module 1330 includes a transmission power reduction module 1336. Transmission power reduction module 1336 reduces the transmission power level when the received beacon signal portion indicates a higher priority than a priority level indicated by a previously received beacon signal portion that was used to control transmission power.

Beacon signal information detection module 1332 determines priority information from a set of beacon symbols included in a received beacon signal portion, said priority information being encoded over a plurality of beacon symbols. In some embodiments, the priority information is coded at least partially by positions of beacon symbols in a set of beacon symbol transmission units used to transmit a beacon signal portion. In various embodiments, the priority information is coded at least partially based on changes in beacon symbol positions in a set of beacon symbol transmission units used to transmit a beacon signal portion. In some embodiments, the priority information is coded at least partially based on changes in beacon symbol positions in a set of beacon symbol transmission units used to transmit a beacon signal portion over a period of time including multiple beacon symbol transmission time periods. In various embodiments, the beacon symbol positions a set of beacon symbol transmission units correspond to a predetermined tone hopping pattern corresponding to the priority level to be communicated in some embodiment, a unique beacon symbol pattern is used to communicate a top priority indicating a higher priority than all other beacons used to communicate priority information.

Data/information 1316 includes received beacon signal portion information (received beacon signal port 1 information 1338, ..., received beacon signal portion N information 1340), transmission decision information 1342, user data to be transmitted 1344, current priority associated with the wireless terminal 1346, user data transmission power level information 1348, priority level information associated with the received beacon signal portions (priority associated with received beacon signal portion 1 1350, ..., priority associated with received beacon signal portion N 1352), generated beacon signal portion information 1354, and beacon signal decoding information 1356.

Received beacon signal portion 1 information 1338 includes beacon symbol information 1358 and priority information 1360. Priority information 1370 includes at least one of device priority information 1362, user priority information 1364, and session priority information 1366.

Received beacon signal portion N information 1340 includes beacon symbol information 1368 and priority information 1370. Priority information 1360 includes at least one of device priority information 1372, user priority information 1374, and session priority information 1376.

Transmission decision 1342 is an output of transmission decision module 1322, indicating whether or not WT 1300 is permitted to transmit. User data to be transmitted 1344 is, e.g., voice, other audio data, image data, text data, file data, etc. that WT 1300 intends to transmit to a peer in a peer-peer communications session, if authorized.

Current priority associated with the wireless terminal 1346 indicates the current priority level associated with WT 1300, used by priority based control module 1334 for comparisons. In some embodiments, the current priority of a wireless terminal can, and sometimes does change over times, e.g., as a function of session information and/or user identification information.

Priority associated with received beacon signal portion 1 1350 and priority associated with received beacon portion N 1352 correspond to received beacon signal portions (1338, ..., 1340) respectively, and are used by transmission decision module 1322.

Generated beacon signal portion information 1354, e.g., information corresponding to a beacon signal burst including a set of beacon symbols and a set of intentional nulls, is an output of beacon signal generation module 1324.

User data transmission power level information 1348 includes power level adjustment information 1378, e.g., information indicating an amount of power reduction to be implemented in response to a beacon signal detected of higher priority.

Beacon signal decoding information 1356 includes beacon symbol position information 1380 and tone hopping pattern/priority level information 1382. Beacon signal decoding information 1356 is used by beacon signal information detection module 1332 when processing beacon symbol information, e.g., info 1358, of one or more received beacon signal portion to obtain priority information being conveyed by the beacon signals, e.g. one or more of device priority information 1362, user device priority information 1364, and session priority information 1366.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, scanning for beacon signals, recovering information from received beacon signals, determining a timing adjustment, implementing a timing adjustment, changing a mode of operation, initiating a communication session, comparing priority levels of user beacon signals, determining path loss, determining a reference from a fixed location beacon transmitter, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links, with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a mobile wireless communications device, comprising:
   monitoring during a first period of time to detect at least a portion of a first beacon signal including at least one beacon symbol in a first communications band; and
   when a beacon signal portion including at least one beacon symbol is not detected during said first period of time, transmitting a first signal over the air during a second period of time following said first period of time, said first signal being
   a second beacon signal communicating a session priority level of a communications session in which said wireless communications device is a participant.

2. The method of claim 1, further comprising:
   storing in a memory: i) device priority information, ii) user priority information and iii) session priority information.

3. The method of claim 1, wherein said second period of time has a predetermined time offset from the start of said first period of time.

4. The method of claim 1, wherein said second beacon signal communicates said session priority level, the method further comprising:
   determining said session priority level to be a higher one of a first priority level corresponding to said mobile wireless communications device and a second priority level corresponding to a second device with which said mobile wireless communications device has a communications session.

5. The method of claim 1, further comprising:
   detecting a portion of a received beacon signal communicating a priority level; and
   determining a transmission power level to use for the transmission of data as a function of the priority level communicated by said detected portion of a received beacon signal.

6. The method of claim 1, wherein said second beacon signal further communicates a user identifier.

7. The method of claim 1, wherein said second beacon signal is transmitted in said first communications band and further indicates that a second communications band is allowed to be used for peer-to-peer communications.

8. The method of claim 1, wherein said second beacon signal further communicates a maximum power that a transmitter in the mobile wireless communications device is capable of transmitting.

9. The method of claim 1, wherein said second beacon signal further communicates a device priority indicating the priority level of the mobile wireless communications device.

10. The method of claim 1, wherein said second beacon signal further communicates current transmission power level information in addition to other information.

11. The method of claim 4,
    further comprising transmitting user data in addition to said first signal.

12. The method of claim 11, wherein said first signal is transmitted prior to said user data, said first signal and said user data being transmitted during non-overlapping time periods.

13. The method of claim 12, wherein transmitting said user data includes transmitting the user data into the first band.

14. The method of claim 5, wherein said session priority is the maximum priority level of the second device.

15. A mobile wireless communications device, comprising:
    a beacon detection module for detecting receipt of at least one beacon symbol communicated in a first communications band;
    a transmitter; and
    a transmission control module for controlling signal transmission as a function of an output of said beacon detection module, said transmission control module controlling said transmitter to transmit a first signal over the air during a second period of time following a first period of time when a beacon signal portion including at least one beacon symbol is not detected during said first period of time, said first signal being a second beacon signal communicating a session priority level of a communications session in which said wireless communications device is a participant.

16. The mobile wireless communications device of claim 15, further comprising:
    a memory including stored device priority information, stored user priority information and stored session priority information.

17. The mobile wireless communications device of claim 15, further comprising:
    a memory including stored device priority information stored session priority information, said stored session priority information indicating a session priority, said session priority being a higher one of a first priority level corresponding to said mobile wireless communications device and a second priority level corresponding to a second device with which said mobile wireless communications device has a communications session.

18. The mobile wireless communications device of claim 15, further comprising:
    a beacon symbol generation module; and
    wherein said second beacon signal communicates said session priority level, said session priority level being a higher one of a first priority level corresponding to said mobile wireless communications device and a second priority level corresponding to a second device with which said mobile wireless communications device has a communications session.

19. The mobile wireless communications device of claim 18, further comprising:
    a beacon information detection module for determining an identification value communicated by a detected portion of a beacon signal.

20. The mobile wireless communications device of claim 19, wherein said identification value is a user identifier.

21. The mobile wireless communications device of claim 18, further comprising:
    a receiver for receiving beacon signal portions transmitted in said first communications band; and
    a control module for controlling the band in which said receiver and transmitter operate, said receiver and transmitter being controlled to use the same band in a time division multiplexed basis.

22. The mobile wireless communications device of claim 21, further comprising:
    a user data transmission control module for controlling transmission of user data in addition to said first signal in said first communications band.

23. The mobile wireless communications device of claim 22,
    wherein said first signal is transmitted prior to said user data; and wherein said user data transmission control module controls transmission of said user data to occur in a transmission time period which does not overlap transmission of said first signal.

24. The mobile wireless communications device of claim 23, wherein said user data transmission control module controls transmission of user data so that user data is transmitted into the first band.

25. The mobile wireless communications device of claim 23, further comprising:
a response detection module for detecting a response to said user data transmission from another device with which said wireless communications device is communicating on a peer to peer basis.

26. A mobile wireless communications device, comprising:
means for detecting beacon signals for detecting receipt of at least one beacon symbol communicated in a first communications band;
means for transmitting over the air; and
means for controlling said means for transmitting over the air for controlling signal transmission as a function of an output of said means for detecting beacon signals, said means for controlling said means for transmitting over the air to transmit a first signal during a second period of time following a first period of time when a beacon signal portion including at least one beacon symbol is not detected during said first period of time, said first signal being a second beacon signal communicating a session priority level of a communications session in which said wireless communications device is a participant.

27. The mobile wireless communications device of claim 26, means for storing: i) device priority information, ii) user priority information, and iii) session priority information.

28. The mobile wireless communications device of claim 26, wherein said second period of time has a predetermined time offset from the start of said first period of time.

29. The mobile wireless communications device of claim 26, further comprising:
means for generating beacon symbols; and
wherein said second beacon signal communicates said session priority level, said session priority level is a higher one of a first priority level corresponding to said mobile wireless communications device and a second priority level corresponding to a second device with which said mobile wireless communications device has a communications session.

30. The mobile wireless communications device of claim 29, further comprising:
means for recovering information from beacon signals for determining an identification value communicated by a detected portion of a beacon signal.

31. The mobile wireless communications device of claim 30, wherein said identification value is a user identifier.

32. A non-transitory computer readable medium embodying machine executable instructions for controlling a mobile wireless communications device, to perform the steps of:
monitoring during a first period of time to detect at least a portion of a first beacon signal including at least one beacon symbol in a first communications band; and
when a beacon signal portion including at least one beacon symbol is not detected during said first period of time, transmit a first signal over the air during a second period of time following said first period of time, said first signal being a second beacon signal communicating a session priority level of a communications session in which said wireless communications device is a participant.

33. The non-transitory computer readable medium of claim 32, further comprising stored information including: i) device priority information, ii) user priority information and iii) session priority information.

34. The non-transitory computer readable medium of claim 32, wherein said second period of time has a predetermined time offset from the start of said first period of time, the computer readable medium further includes machine executable instructions including the predetermined time offset.

35. The non-transitory computer readable medium of claim 32, wherein said second beacon signal communicates said session priority level, said non-transitory computer readable medium embodying machine executable instructions for controlling a mobile wireless communications device to determine said session priority level to be a higher one of a first priority level corresponding to said mobile wireless communications device and a second priority level corresponding to a second device with which said mobile wireless communications device has a communications session.

36. The non-transitory computer readable medium of claim 32 further embodying machine executable instructions for controlling said mobile wireless communications device to perform the steps of:
detecting a portion of a received beacon signal communicating an identification value; and
recovering said identification value from said detected portion of said received beacon signal.

37. The non-transitory computer readable medium of claim 36, wherein said identification value is a user identifier.

38. An apparatus for use in a mobile wireless communications device, the apparatus comprising:
a processor configured to:
monitor during a first period of time to detect at least a portion of a first beacon signal including at least one beacon symbol in a first communications band; and
when a beacon signal portion including at least one beacon symbol is not detected during said first period of time, to transmit a first signal over the air during a second period of time following said first period of time, said first signal being a second beacon signal communicating a session priority level of a communications session in which said wireless communications device is a participant.

39. The apparatus of claim 38, further comprising:
a memory coupled to said processor, said memory including: i) device priority information, ii) user priority information and iii) session priority information.

40. The apparatus of claim 38, wherein said second period of time has a predetermined time offset from the start of said first period of time,
and wherein said processor is further configured to:
use the predetermined time offset in determining the start of the transmission time of said first signal.

41. The apparatus of claim 38, wherein said second beacon signal communicates said session priority level, said session priority level being a higher one of a first priority level corresponding to said mobile wireless communications device and a second priority level corresponding to a second device with which said mobile wireless communications device has a communications session.

42. The apparatus of claim 38, wherein said processor is further configured to:
detect a portion of a received beacon signal communicating an identification value, and recover said identification value from said detected portion of said received beacon signal.

43. The apparatus of claim 42, wherein said identification value is a user identifier.

* * * * *